US009796247B2

(12) United States Patent
Miyakoshi et al.

(10) Patent No.: US 9,796,247 B2
(45) Date of Patent: Oct. 24, 2017

(54) VEHICLE AIR CONDITIONER WITH ENLARGED EFFECTIVE RANGE OF A DEHUMIDIFYING AND COOLING MODE

(71) Applicant: Sanden Holdings Corporation, Isesaki-shi, Gunma (JP)

(72) Inventors: Ryo Miyakoshi, Isesaki (JP); Kenichi Suzuki, Isesaki (JP); Hidenori Takei, Isesaki (JP); Kouhei Yamashita, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 277 days.

(21) Appl. No.: 14/441,303

(22) PCT Filed: Nov. 11, 2013

(86) PCT No.: PCT/JP2013/080473
§ 371 (c)(1),
(2) Date: May 7, 2015

(87) PCT Pub. No.: WO2014/073688
PCT Pub. Date: May 15, 2014

(65) Prior Publication Data
US 2015/0306939 A1   Oct. 29, 2015

(30) Foreign Application Priority Data
Nov. 9, 2012   (JP) .................. 2012-247505

(51) Int. Cl.
*F25B 13/00* (2006.01)
*B60H 1/32* (2006.01)
*B60H 1/00* (2006.01)
(52) U.S. Cl.
CPC ....... *B60H 1/3213* (2013.01); *B60H 1/00921* (2013.01)

(58) Field of Classification Search
CPC ............ B60H 1/00921; B60H 1/00035; B60H 1/3204; B60H 1/3207; B60H 1/3213
(Continued)

(56) References Cited

U.S. PATENT DOCUMENTS

2005/0061011 A1   3/2005   Yakumaru et al.
2006/0005557 A1*  1/2006   Takano .............. B60H 1/00878
                                                             62/238.6
(Continued)

FOREIGN PATENT DOCUMENTS

CN   1539662 A   10/2004
CN   1573260 A    2/2005
(Continued)

OTHER PUBLICATIONS

Japan Patent Office, International Search Report for Application No. PCT/JP2013/080473, dated Jan. 28, 2014. (Counterpart to above-captioned patent application.).

*Primary Examiner* — Ljiljana Ciric
(74) *Attorney, Agent, or Firm* — Baker Botts L.L.P.

(57) ABSTRACT

A vehicle air conditioner which can enlarge an effective range of a dehumidifying and cooling mode to realize comfortable air condition in a vehicle interior. A controller changes and executes at least one of a heating mode, a dehumidifying and heating mode, a dehumidifying and cooling mode, and a cooling mode. In at least the dehumidifying and cooling mode, the controller controls a capability of a compressor (2) on the basis of a temperature of a heat absorber (9), and controls a valve position of an outdoor expansion valve (6) on the basis of a temperature or a pressure of the radiator (4), and executes a radiator temperature prior mode to enlarge the capability of the compressor (2), in a case where heat radiation in the radiator (4) runs short.

20 Claims, 22 Drawing Sheets

(58) Field of Classification Search
USPC ............................................................ 62/160
See application file for complete search history.

(56) References Cited

U.S. PATENT DOCUMENTS

| | | | | |
|---|---|---|---|---|
| 2011/0016896 A1* | 1/2011 | Oomura | ............ | B60H 1/00785 62/155 |
| 2012/0255319 A1* | 10/2012 | Itoh | ...................... | F24F 3/1405 62/160 |
| 2015/0283872 A1* | 10/2015 | Miyakoshi | ........... | B60H 1/3204 62/160 |
| 2016/0084554 A1* | 3/2016 | Suzuki | ............... | B60H 1/00921 62/160 |
| 2016/0185185 A1* | 6/2016 | Suzuki | ............... | B60H 1/00921 237/5 |
| 2016/0185186 A1* | 6/2016 | Miyakoshi | ......... | B60H 1/00385 62/160 |
| 2016/0193896 A1* | 7/2016 | Miyakoshi | ......... | B60H 1/00385 62/155 |
| 2016/0201959 A1* | 7/2016 | Miyakoshi | ............... | B60H 1/32 62/155 |
| 2016/0201960 A1* | 7/2016 | Miyakoshi | ......... | B60H 1/00385 62/154 |
| 2016/0236538 A1* | 8/2016 | Suzuki | ............... | B60H 1/00921 |
| 2016/0236539 A1* | 8/2016 | Suzuki | ............... | B60H 1/00385 |
| 2017/0080778 A1* | 3/2017 | Suzuki | ...................... | F25B 1/00 |

FOREIGN PATENT DOCUMENTS

| | | |
|---|---|---|
| CN | 1610809 A | 4/2005 |
| CN | 101029786 A | 9/2007 |
| EP | 1 489 367 A1 | 12/2004 |
| JP | 2004-085176 A | 3/2004 |
| JP | 2004-189213 A | 7/2004 |
| JP | 2009-166805 A | 7/2009 |
| JP | 2012-176659 A | 9/2012 |
| WO | 03/083381 A1 | 10/2003 |
| WO | 2004/051157 A1 | 6/2004 |
| WO | 2012/108240 A1 | 8/2012 |

* cited by examiner

FIG. 9

| OPERATION MODE | ON START UP (\|SET TEMP−INTERIOR TEMP\| ≧ PREDETERMINED VALUE) | STABLE CONDITION AFTER START (INTERIOR TEMP≒SET TEMP) |
|---|---|---|
| HEATING | · OUTDOOR AIR TEMP≧INDOOR AIR TEMP<br>  ⇒OUTDOOR AIR INTRODUCING<br>· OUTDOOR AIR TEMP<INDOOR AIR TEMP<br>  ⇒INDOOR AIR CIRCULATING<br><br>· OUTDOOR AIR HUMIDITY≧INDOOR AIR HUMIDITY<br>  ⇒INDOOR AIR CIRCULATING<br>· OUTDOOR AIR HUMIDITY<INDOOR AIR HUMIDITY<br>  ⇒OUTDOOR AIR INTRODUCING | · INDOOR AIR CO2 CONCENTRATION≧ PREDETERMINED VALUE<br>  ⇒OUTDOOR AIR INTRODUCING<br>· INDOOR AIR CO2 CONCENTRATION< PREDETERMINED VALUE<br>  ⇒INDOOR AIR CIRCULATING<br><br>· INDOOR AIR INTRODUCING TIME≧ PREDETERMINED VALUE<br>  ⇒OUTDOOR AIR INTRODUCING<br><br>· OUTDOOR AIR HUMIDITY≧INDOOR AIR HUMIDITY<br>  ⇒INDOOR AIR CIRCULATING<br>· OUTDOOR AIR HUMIDITY<INDOOR AIR HUMIDITY<br>  ⇒OUTDOOR AIR INTRODUCING<br><br>· OUTDOOR AIR TEMP=TARGET OUTLET TEMP±α<br>  ⇒OUTDOOR AIR INTRODUCING<br>· OTHER THAN ABOVE<br>  ⇒INDOOR AIR CIRCULATING |
| DEHUMIDIFYING AND HEATING / INTERNAL CYCLE | | |
| COOLING / DEHUMIDIFYING AND COOLING | · OUTDOOR AIR TEMP≧INDOOR AIR TEMP<br>  ⇒INDOOR AIR CIRCULATING<br>· OUTDOOR AIR TEMP<INDOOR AIR TEMP<br>  ⇒OUTDOOR AIR INTRODUCING<br>· OUTDOOR AIR HUMIDITY≧INDOOR AIR HUMIDITY<br>  ⇒INDOOR AIR CIRCULATING<br>· OUTDOOR AIR HUMIDITY<INDOOR AIR HUMIDITY<br>  ⇒OUTDOOR AIR INTRODUCING | |

VEHICLE AIR CONDITIONER WITH ENLARGED EFFECTIVE RANGE OF A DEHUMIDIFYING AND COOLING MODE

CROSS-REFERENCE TO RELATED APPLICATIONS

This application is a U.S. National Stage Patent Application under 37 U.S.C. §371 of International Patent Application No. PCT/JP2013/080473, filed on Nov. 11, 2013, which claims the benefit of Japanese Patent Application No. JP 2012-247505, filed on Nov. 9, 2012, the disclosures of which are incorporated herein by reference in their entirety.

TECHNICAL FIELD

The present invention relates to an air conditioner of a heat pump system which conditions air in a vehicle interior, and more particularly, it relates to an air conditioner applicable to a hybrid car or an electric car.

BACKGROUND ART

Due to actualization of environmental problems in recent years, hybrid cars and electric cars have spread. Furthermore, as an air conditioner which is applicable to such a vehicle, there has been developed an air conditioner which comprises a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed outside the vehicle interior to let the refrigerant radiate or absorb heat, and which can change a heating operation in which the refrigerant discharged from the compressor radiates heat in the radiator and the refrigerant by which heat has been radiated in this radiator absorbs heat in the outdoor heat exchanger, a dehumidifying and heating operation in which the refrigerant discharged from the compressor radiates heat in the radiator and the refrigerant by which heat has been radiated in the radiator absorbs heat only in the heat absorber or in this heat absorber and the outdoor heat exchanger, a cooling operation in which the refrigerant discharged from the compressor radiates heat in the outdoor heat exchanger and absorbs heat in the heat absorber, and a dehumidifying and cooling operation in which the refrigerant discharged from the compressor radiates heat in the radiator and the outdoor heat exchanger and absorbs heat in the heat absorber (e.g., see Patent Document 1).

CITATION LIST

Patent Documents

Patent Document 1: Japanese Patent Application Publication No. 2012-176659

SUMMARY OF THE INVENTION

Problems to be Solved by the Invention

Here, in the abovementioned dehumidifying and cooling operation, a temperature of a heat absorber has heretofore been controlled in accordance with a revolution number of a compressor. In addition, a pressure of a radiator (a high pressure) has been controlled by an outdoor expansion valve which decompresses a refrigerant flowing into an outdoor heat exchanger. Therefore, when the temperature of the heat absorber converges at a target value and a valve position of the outdoor expansion valve reaches a controlling lower limit value (the lower limit of controlling) but the high pressure of a refrigerant circuit does not rise to a target value, a temperature of the radiator causes shortage, and hence there has been the problem that an operation mode has to be changed to another operation mode such as a dehumidifying and heating operation.

The present invention has been developed to solve such a conventional technical problem, and an object thereof is to provide a vehicle air conditioner which can enlarge an effective range of a dehumidifying and cooling mode to realize comfortable air condition in a vehicle interior.

Means for Solving the Problems

A vehicle air conditioner of the present invention comprises a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, an expansion valve which decompresses the refrigerant flowing into the outdoor heat exchanger, and control means, this control means being configured to change and execute at least one of a heating mode in which the refrigerant discharged from the compressor radiates heat in the radiator and the refrigerant by which heat has been radiated is decompressed and then absorbs heat in the outdoor heat exchanger, a dehumidifying and heating mode in which the refrigerant discharged from the compressor radiates heat in the radiator and the refrigerant by which heat has been radiated is decompressed and then absorbs heat only in the heat absorber or in the heat absorber and the outdoor heat exchanger, a dehumidifying and cooling mode in which the refrigerant discharged from the compressor radiates heat in the radiator and the outdoor heat exchanger and the refrigerant by which heat has been radiated is decompressed and then absorbs heat in the heat absorber, and a cooling mode in which the refrigerant discharged from the compressor radiates heat in the outdoor heat exchanger and the refrigerant by which heat has been radiated is decompressed and then absorbs heat in the heat absorber, the vehicle air conditioner being characterized in that in at least the dehumidifying and cooling mode, the control means controls a capability of the compressor on the basis of a temperature of the heat absorber, controls a valve position of the expansion valve on the basis of a temperature or a pressure of the radiator, and executes a radiator temperature prior mode to enlarge the capability of the compressor, in a case where heat radiation in the radiator runs short.

The vehicle air conditioner of the invention of claim 2 is characterized in that in the above invention, the control means has, in the dehumidifying and heating mode, an internal cycle mode in which the refrigerant is inhibited from flowing into the outdoor heat exchanger and the refrigerant absorbs heat only in the heat absorber, also has, in this internal cycle mode, a state where the capability of the compressor is controlled on the basis of the temperature of the heat absorber and the valve position of the expansion valve is controlled on the basis of the temperature or the pressure of the radiator, and also executes the radiator temperature prior mode in the state.

The vehicle air conditioner of the invention of claim 3 is characterized in that in the above respective inventions, the control means lowers a target temperature of the heat absorber in a range where frost is not formed in the heat absorber, thereby enlarging the capability of the compressor.

The vehicle air conditioner of the invention of claim 4 comprises an electric heater to heat the vehicle interior in the above respective inventions, and is characterized in that the control means allows the electric heater to heat in the radiator temperature prior mode.

The vehicle air conditioner of the invention of claim 5 comprises an indoor blower which allows the air to flow through the air flow passage in the above respective inventions, and is characterized in that the control means enlarges an air volume of the indoor blower in the radiator temperature prior mode.

The vehicle air conditioner of the invention of claim 6 comprises a suction changing damper which changes an outdoor air introducing mode to introduce outdoor air into the air flow passage and an indoor air circulating mode to introduce the air in the vehicle interior into the air flow passage in the above respective inventions, and is characterized in that in the radiator temperature prior mode, the control means transfers to the indoor air circulating mode in a case where at least an interior temperature is higher than an outdoor air temperature, and transfers to the outdoor air introducing mode in a case where at least the outdoor air temperature is higher than the interior temperature.

Advantageous Effect of the Invention

According to the vehicle air conditioner of the present invention, in at least a dehumidifying and cooling mode in which a refrigerant discharged from a compressor radiates heat in a radiator and an outdoor heat exchanger and the refrigerant by which heat has been radiated is decompressed and then absorbs heat in a heat absorber, control means controls a capability of the compressor on the basis of a temperature of the heat absorber, controls a valve position of an expansion valve which decompresses the refrigerant flowing into the outdoor heat exchanger on the basis of a temperature or a pressure of the radiator, and executes a radiator temperature prior mode to enlarge the capability of the compressor, in a case where heat radiation in the radiator runs short. Therefore, when the temperature of the heat absorber converges at a target value and the valve position of the expansion valve is a lower limit of controlling but the temperature of the radiator causes shortage, the capability of the compressor is enlarged to raise a high pressure, so that a heat radiation amount of the refrigerant in the radiator can be enlarged.

In consequence, it is possible to acquire reheating by the radiator in the dehumidifying and cooling mode and acquire an air conditioning performance, and an effective range of the dehumidifying and cooling mode can be enlarged to realize comfortable air condition in the vehicle interior.

Additionally, as in the invention of claim 2, the control means has, in the dehumidifying and heating mode, an internal cycle mode in which the refrigerant is inhibited from flowing into the outdoor heat exchanger and the refrigerant absorbs heat only in the heat absorber, also has, in this internal cycle mode, a state where the capability of the compressor is controlled on the basis of the temperature of the heat absorber and the valve position of the expansion valve is controlled on the basis of the temperature or the pressure of the radiator, and also executes the radiator temperature prior mode in the state, so that also in such an internal cycle mode, it is possible to realize the comfortable air condition by the heat radiation from the radiator.

In this case, as in the invention of claim 3, the control means lowers a target temperature of the heat absorber in a range where frost is not formed in the heat absorber, thereby enlarging the capability of the compressor, so that it is possible to prevent occurrence of the frost formation due to an excessive temperature drop of the heat absorber, and energy saving can be achieved.

Additionally, when the invention of claim 4 comprises an electric heater to heat the vehicle interior, the control means allows the electric heater to heat in the radiator temperature prior mode, so that it is possible to complement the shortage of the temperature of the radiator by the electric heater and to realize further comfortable air condition in the vehicle interior.

Furthermore, when the control means enlarges an air volume of an indoor blower which allows the air to flow through the air flow passage, in the radiator temperature prior mode as in the invention of claim 5, an amount of heat to be absorbed in the heat absorber is enlarged to raise the high pressure, so that it is possible to further rapidly eliminate the shortage of the temperature of the radiator.

Furthermore, as in the invention of claim 6, in the radiator temperature prior mode, the control means transfers a suction changing damper, which changes an outdoor air introducing mode to introduce outdoor air into the air flow passage and an indoor air circulating mode to introduce the air in the vehicle interior into the air flow passage, to the indoor air circulating mode in a case where at least an interior temperature is higher than an outdoor air temperature, and transfers the suction changing damper to the outdoor air introducing mode in a case where at least the outdoor air temperature is higher than the interior temperature. In this case, the air having a higher temperature in the air in the vehicle interior and the outdoor air is passed through the heat absorber to enlarge the amount of the heat to be absorbed in the heat absorber and raise the high pressure, so that it is possible to further rapidly eliminate the shortage of the temperature or the radiator.

BRIEF DESCRIPTION OF THE DRAWINGS

FIG. 9 is a diagram to explain control of a suction changing damper by the controller of FIG. 2;

MODE FOR CARRYING OUT THE INVENTION

Hereinafter, an embodiment of the present invention will be described in detail with reference to the drawings.

Figure 1:
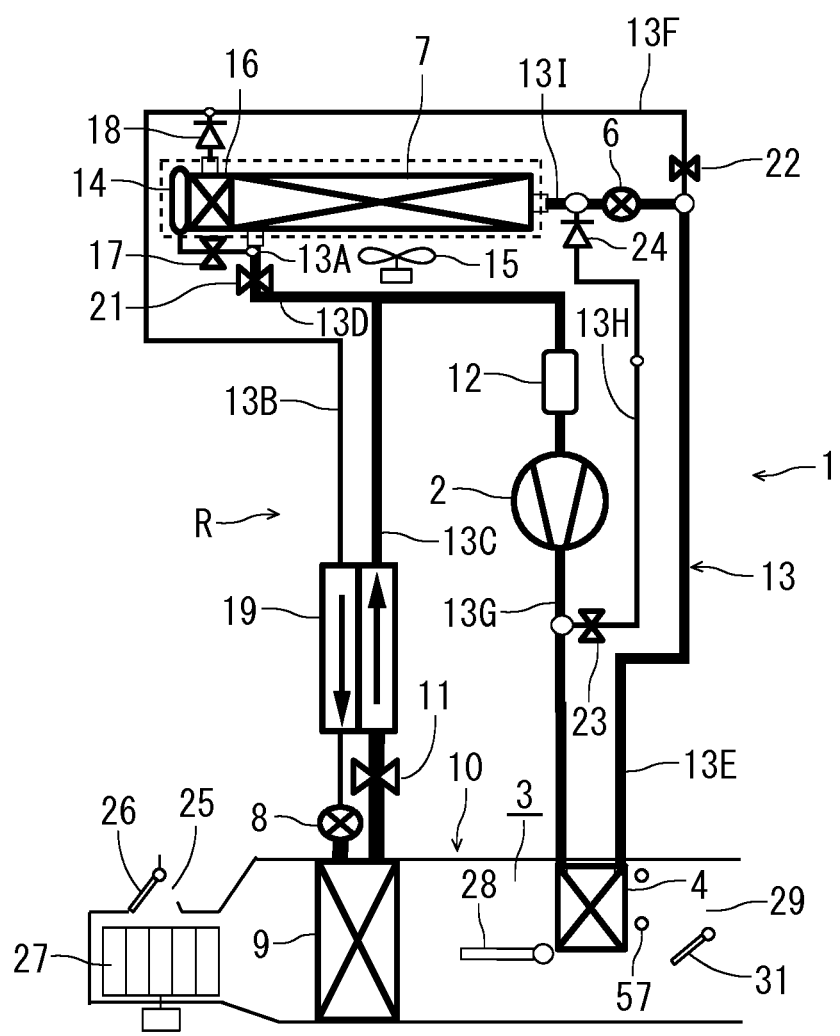
FIG. 1 is a constitutional view of a vehicle air conditioner of one embodiment to which the present invention is applied.

FIG. 1 shows a constitutional view of a vehicle air conditioner 1 of one embodiment of the present invention. In this case, a vehicle of the embodiment to which the present invention is applied is an electric car (EV) which does not have an engine (an internal combustion engine), and runs by driving an electric motor for running by a power charged in a battery (which is not shown), and the vehicle air conditioner 1 of the present invention is driven by the power of the battery.

That is, in the electric car in which heating cannot be performed by waste heat of the engine, the vehicle air conditioner 1 of the embodiment performs the heating by a heat pump operation in which a refrigerant circuit is used, and further selectively executes respective operation modes of dehumidifying and heating, cooling and dehumidifying, cooling, and the like. It is to be noted that the vehicle is not limited to the electric car, and the present invention is also effective for a so-called hybrid car in which the engine is used together with the electric motor for the running, and is further applicable also to a usual car which runs by the engine.

The vehicle air conditioner 1 of the embodiment performs air conditioning (heating, cooling, dehumidifying, and ventilation) in the electric car, and there are successively connected, by a refrigerant pipe 13, an electric compressor 2 which compresses a refrigerant to raise a pressure, a radiator 4 disposed in an air flow passage 3 of an HVAC unit 10 in which air in the vehicle interior is passed and circulated, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying and heating, an evaporation capability control valve 11 which regulates an evaporation capability in the heat absorber 9, an accumulator 12 and the like, so that a refrigerant circuit R is constituted. It is to be noted that in the outdoor heat exchanger 7, an outdoor blower 15 is disposed to perform the heat exchange between the outdoor air and the refrigerant when the vehicle is stopped.

In addition, the outdoor heat exchanger 7 has a header portion 14 and a subcooling portion 16 successively on a refrigerant downstream side, a refrigerant pipe 13A extended out from the outdoor heat exchanger 7 is connected to the header portion 14 via a solenoid valve (an opening/closing valve) 17 opened during the cooling, and an outlet of the subcooling portion 16 is connected to the indoor expansion valve 8 via a check valve 18. It is to be noted that the header portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a refrigerant pipe 13G on a discharge side of the compressor 2 is branched, and this branched refrigerant pipe 13H communicates to be connected to a refrigerant pipe 13I between the outdoor expansion valve 6 and the outdoor heat exchanger 7 via a solenoid valve (an opening/closing valve) 23 which is opened during defrosting of the outdoor heat exchanger 7 to allow the high-temperature refrigerant (a hot gas) discharged from the compressor 2 to flow directly into the outdoor heat exchanger 7 and a check valve 24. It is to be noted that a direction of the refrigerant pipe 13I of the check valve 24 is the forward direction.

Additionally, in the air flow passage 3 on an air upstream side of the heat absorber 9, respective suction ports (represented by a suction port 25 in FIG. 1), e.g., an indoor air suction port and an outdoor air suction port are formed, and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in the air flow passage 3 on the air upstream side of the radiator 4, an air mix damper 28 is disposed to regulate a degree of flow of the indoor air or the outdoor air through the radiator 4. Further, in the air flow passage 3 on an air downstream side of the radiator 4, each outlet of foot, vent or defroster (represented by an outlet 29 in FIG. 1) is formed, and in the outlet 29, an outlet changing damper 31 is disposed to perform changing control of blowing of the air from each outlet mentioned above.

Figure 2:
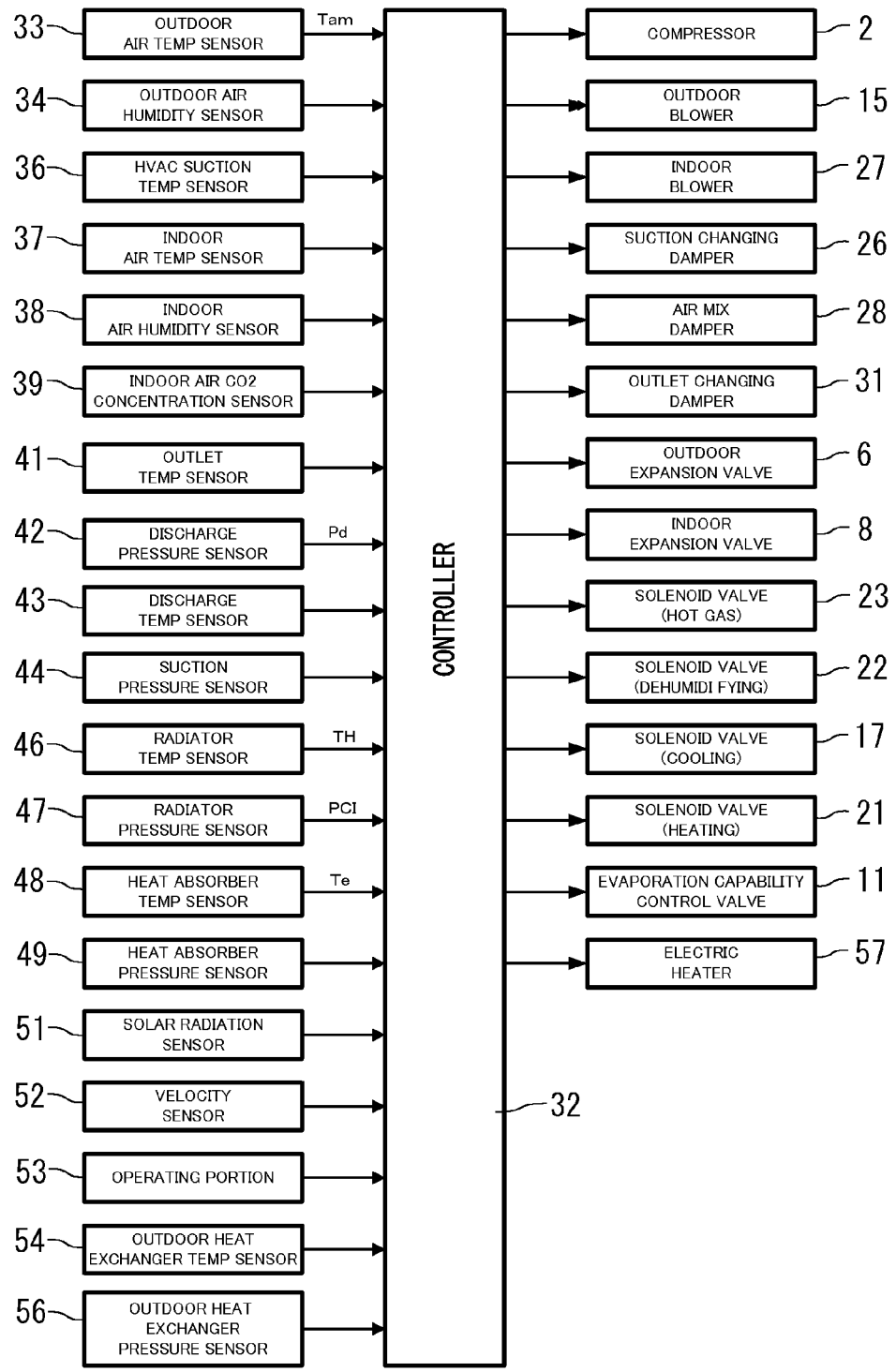
FIG. 2 is a block diagram of an electric circuit of a controller of the vehicle air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a suction temperature from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the radiator 4 itself or the temperature of the air heated in the radiator 4), a radiator pressure sensor 47 which detects a refrigerant pressure of the radiator 4 (the pressure in the radiator 4 or the pressure of the refrigerant flowing out from the radiator 4), a heat absorber temperature sensor 48 which detects a temperature of the heat absorber 9 (the temperature of the heat absorber 9 itself or the air cooled in the heat absorber 9), a heat absorber pressure sensor 49 which detects a refrigerant pressure of the heat absorber 9 (the pressure in the heat absorber 9 or the pressure of the refrigerant flowing out from the heat absorber 9), a solar radiation sensor 51 of, e.g., a photo sensor system to detect a solar radiation amount into the vehicle, a velocity sensor 52 to detect a moving speed of the vehicle (a velocity), an operating portion 53 to set the changing of the temperature or the operation mode, an outdoor heat exchanger temperature sensor 54 which detects a temperature of the outdoor heat exchanger 7, and an outdoor heat exchanger pressure sensor 56 which detects the refrigerant pressure of the outdoor heat exchanger 7.

An output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 23, 22, 17 and 21, and the evaporation capability control valve 11. In addition, the output of the controller 32 is also connected to an electric heater 57 disposed in the air flow passage 3 on the air downstream side of the radiator 4 to complement the heating by the radiator 4, and the controller 32 controls these components on the basis of the outputs of the respective sensors and the setting input by the operating portion 53.

Next, an operation of the vehicle air conditioner 1 of the embodiment having the abovementioned constitution will be described. In the embodiment, the controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Heating Mode

When the heating mode is selected by the controller 32 or a manual operation to the operating portion 53, the controller 32 opens the solenoid valve 21 and closes the solenoid valve 17, the solenoid valve 22 and the solenoid valve 23. Furthermore, the compressor 2 and the respective blowers 15 and 27 are operated, and the air mix damper 28 has a state where the air blown out from the indoor blower 27 is passed through the radiator 4. In consequence, the high-temperature high-pressure gas refrigerant discharged from the compressor 2 flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows through the refrigerant pipe 13E to reach the outdoor expansion valve 6 which decompresses the refrigerant, and then the refrigerant flows into the outdoor heat exchanger 7. The refrigerant flowing into the outdoor heat exchanger 7 evaporates, and the heat is pumped up from the outdoor air passed by running or the outdoor blower 15 (a heat pump). Furthermore, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence the heating in the vehicle interior is performed.

The controller 32 controls a revolution number of the compressor 2 on the basis of a high pressure of the refrigerant circuit R which is detected by the discharge pressure sensor 42 or the radiator pressure sensor 47, also controls a valve position of the outdoor expansion valve 6 on the basis of the temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber

9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed.

The controller 32 controls the revolution number of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Internal Cycle Mode

Next, in the internal cycle mode, the controller 32 closes (shuts off) the outdoor expansion valve 6 in the above state of the dehumidifying and heating mode. That is, it can be considered that this internal cycle mode is a state where the outdoor expansion valve 6 is shut off by the control of the outdoor expansion valve 6 in the dehumidifying and heating mode, and hence the internal cycle mode can be regarded as a part of the dehumidifying and heating mode.

However, when the outdoor expansion valve 6 is closed, the refrigerant is inhibited from flowing into the outdoor heat exchanger 7, and hence all the condensed refrigerant flowing through the radiator 4 and the refrigerant pipe 13E flows through the solenoid valve 22 to the refrigerant pipe 13F. Furthermore, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the revolution number of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2 as described later.

(4) Dehumidifying and Cooling Mode

Next, in the dehumidifying and cooling mode, the controller 32 opens the solenoid valve 17 and closes the solenoid valve 21, the solenoid valve 22 and the solenoid valve 23. Furthermore, the compressor 2 and the respective blowers 15 and 27 are operated, and the air mix damper 28 has the state where the air blown out from the indoor blower 27 is passed through the radiator 4. In consequence, the high-temperature high-pressure gas refrigerant discharged from the compressor 2 flows into the radiator 4. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling in the vehicle interior are performed.

The controller 32 controls the revolution number of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (an after-mentioned radiator pressure PCI) of the radiator 4.

(5) Cooling Mode

Next, in the cooling mode, the controller 32 fully opens the outdoor expansion valve 6 in the above state of the dehumidifying and cooling mode (sets the valve position to an upper limit of controlling), and the air mix damper 28 has a state where the air is not passed through the radiator 4. In consequence, the high-temperature high-pressure gas refrigerant discharged from the compressor 2 flows into the radiator 4. The air in the air flow passage 3 is not passed through the radiator 4, the air therefore only passes here, and the refrigerant flowing out from the radiator 4 flows through the refrigerant pipe 13E to reach the outdoor expansion valve 6.

At this time, the outdoor expansion valve 6 is fully opened and hence the refrigerant flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the header portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed.

Figure 3:
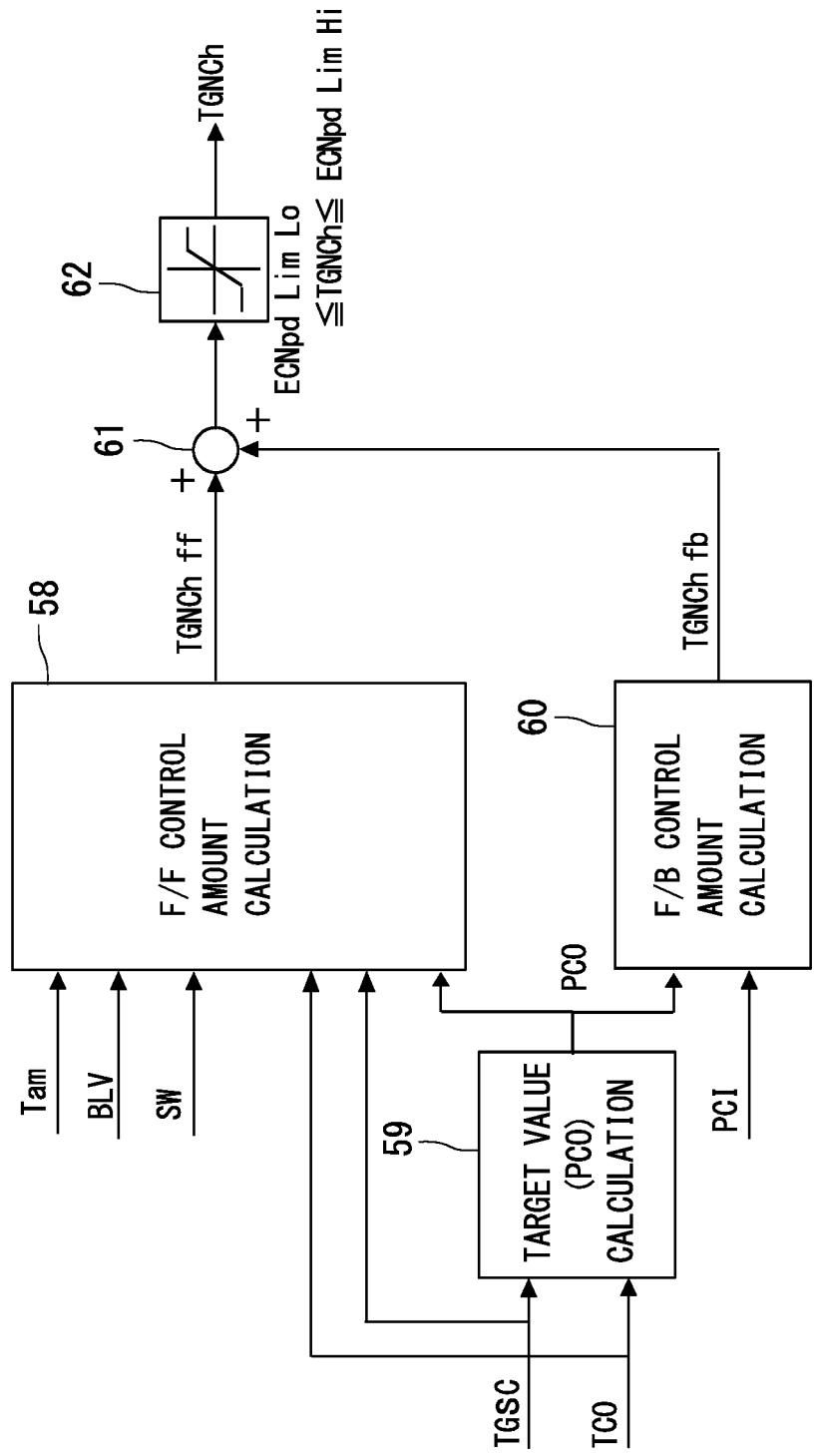
FIG. 3 is a control block diagram concerning compressor control of the controller of FIG. 2.
Figure 4:
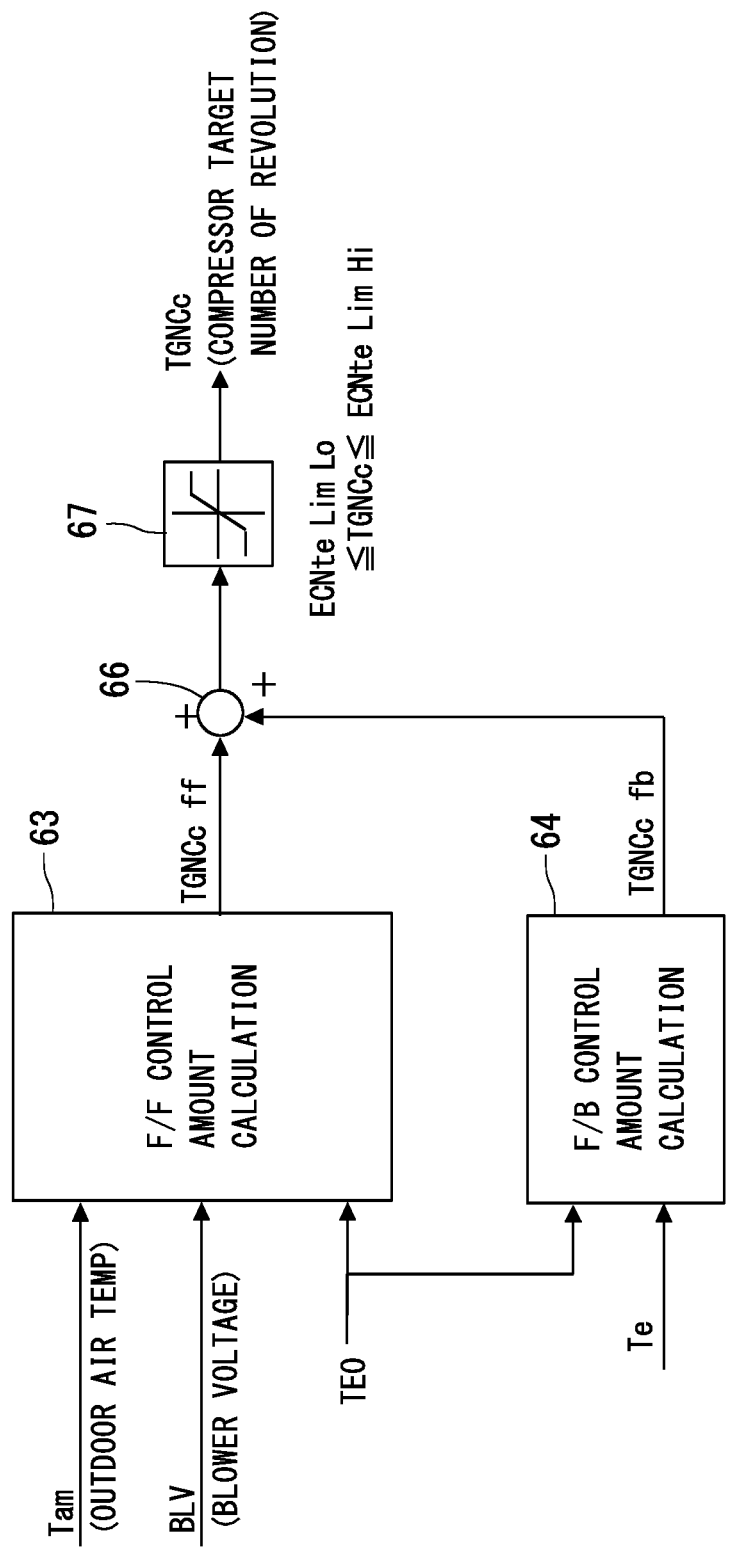
FIG. 4 is another control block diagram concerning the compressor control of the controller of FIG. 2.
Figure 5:
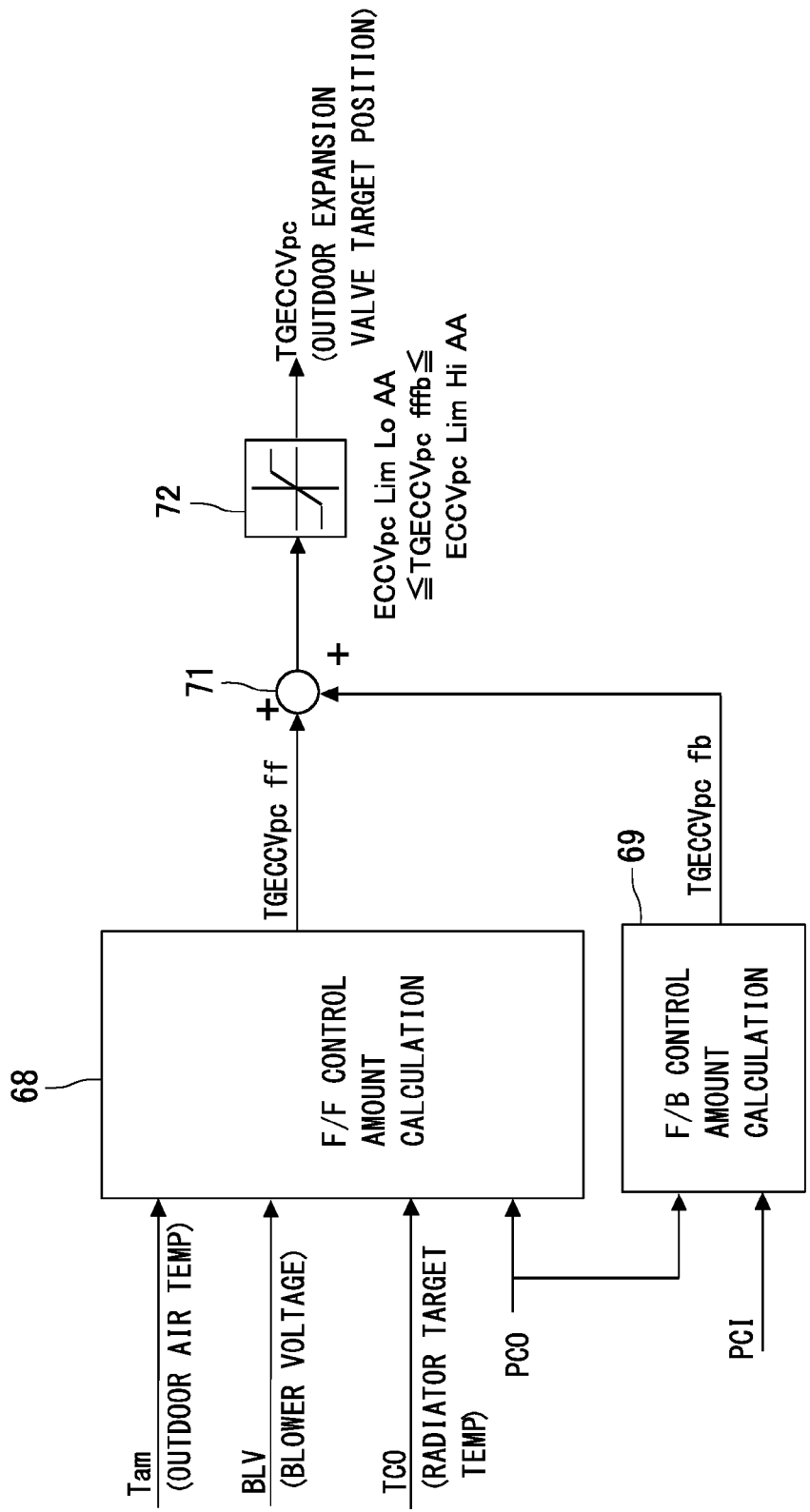
FIG. 5 is a control block diagram concerning outdoor expansion valve control of the controller of FIG. 2.

In this cooling mode, the controller 32 controls the revolution number of the compressor 2 on the basis of the temperature of the heat absorber 9 which is detected by the heat absorber temperature sensor 48. Next, FIG. 3 to FIG. 5 show control block diagrams of the compressor 2 and the outdoor expansion valve 6 by the controller 32 in the abovementioned respective operation modes. FIG. 3 is the control block diagram of the controller 32 which determines a target number of revolution (a compressor target number of revolution) TGNCh of the compressor 2 for the above heating mode and the above dehumidifying and heating mode. An F/F (feedforward) control amount calculation section 58 of the controller 32 calculates an F/F control amount TGNChff of the compressor target number of revolution on the basis of an outdoor air temperature Tam obtained from the outdoor air temperature sensor 33, a blower voltage BLV of the indoor blower 27, an air mix damper opening SW of the air mix damper 28 which is obtained in accordance with SW=(TAO−Te)/(TH−Te), a target subcool degree TGSC which is a target value of a subcool degree SC in the outlet of the radiator 4, a radiator target temperature TCO which is a target value of the temperature of the radiator 4, and a radiator target pressure PCO which is a target value of the pressure of the radiator 4.

It is to be noted that TAO is a target outlet temperature which is a target value of an air temperature from the outlet 29, TH is the temperature of the radiator 4 which is obtained from the radiator temperature sensor 46 (the radiator temperature), and Te is the temperature of the heat absorber 9 which is obtained from the heat absorber temperature sensor 48 (the heat absorber temperature). The air mix damper opening SW varies in a range of 0≤SW≤1, 0 indicates an air mix shut off state where the air is not passed through the radiator 4, and 1 indicates an air mix fully opened state where all the air in the air flow passage 3 is passed through the radiator 4.

The above radiator target pressure PCO is calculated on the basis of the above target subcool degree TGSC and the radiator target temperature TCO by a target value calculation section 59. Furthermore, an F/B (feedback) control amount calculation section 60 calculates an F/B control amount TGNChfb of the compressor target number of revolution on the basis of this radiator target pressure PCO and the radiator pressure PCI which is the refrigerant pressure of the radiator 4. Furthermore, the F/F control amount TGNCnff calculated by the F/F control amount calculation section 58 and the control amount TGNChfb calculated by the F/B control amount calculation section 60 are added by an adder 61, limits of an upper limit of controlling and a lower limit of controlling are attached by a limit setting section 62, and then the compressor target number of revolution TGNCh is determined. In the above heating mode and the dehumidifying and heating mode, the controller 32 controls the revolution number of the compressor 2 on the basis of this compressor target number of revolution TGNCh.

On the other hand, FIG. 4 is the control block diagram of the controller 32 which determines a target number of revolution (a compressor target number of revolution) TGNCc of the compressor 2 for the above cooling mode and the dehumidifying and cooling mode (an after-mentioned normal mode). An F/F control amount calculation section 63 of the controller 32 calculates an F/F control amount TGNCcff of the compressor target number of revolution on the basis of the outdoor air temperature Tam, the blower voltage BLV, and a heat absorber target temperature TEO which is a target value of the temperature of the heat absorber 9.

In addition, an F/B control amount calculation section 64 calculates an F/B control amount TGNCcfb of the compressor target number of revolution on the basis of the heat absorber target temperature TEO and the heat absorber temperature Te. Furthermore, the F/F control amount TGNCcff calculated by the F/F control amount calculation section 63 and the F/B control amount TGNCcfb calculated by the F/B control amount calculation section 64 are added by an adder 66, limits of an upper limit of controlling and a lower limit of controlling are attached by a limit setting section 67, and then the compressor target number of revolution TGNCc is determined. In the cooling mode and the normal mode of the dehumidifying and cooling mode, the controller 32 controls the revolution number of the compressor 2 on the basis of this compressor target number of revolution TGNCc.

It is to be noted that in the above internal cycle mode, the controller 32 controls the revolution number of the compressor 2 by use of a smaller control amount in the compressor target number of revolution TGNCh calculated for the heating mode and the dehumidifying and heating mode and the compressor target number of revolution TGNCc calculated for the cooling mode and the dehumidifying and cooling mode as described above.

Next, FIG. 5 is the control block diagram of the controller 32 which determines a target position (an outdoor expansion valve target position) TGECCVpc of the outdoor expansion valve 6 in the dehumidifying and cooling mode. An F/F control amount calculation section 68 of the controller 32 calculates an F/F control amount TGECCVpcff of the outdoor expansion valve target position on the basis of the outdoor air temperature Tam, the blower voltage BLV, the radiator target temperature TCO, and the radiator target pressure PCO.

In addition, an F/B control amount calculation section 69 calculates an F/B control amount TGECCVpcfb of the outdoor expansion valve target position on the basis of the radiator target pressure PCO and the radiator pressure PCI. Furthermore, the F/F control amount TGECCVpcff calculated by the F/F control amount calculation section 68 and the F/B control amount TGECCVpcfb calculated by the F/B control amount calculation section 69 are added by an adder 71, limits of an upper limit of controlling and a lower limit of controlling are attached by a limit setting section 72, and then the outdoor expansion valve target position TGECCVpc is determined. In the dehumidifying and cooling mode, the controller 32 controls the valve position of the outdoor expansion valve 6 on the basis of this outdoor expansion valve target position TGECCVpc.

The air flowing through the air flow passage 3 is subjected to the cooling from the heat absorber 9 and a heating operation from the radiator 4 (regulated by the air mix damper 28) in the above respective operation modes, to be blown out into the vehicle interior from the outlet 29. The controller 32 calculates the target outlet temperature TAO on the basis of the outdoor air temperature Tam detected by the outdoor air temperature sensor 33, the interior temperature which is detected by the indoor air temperature sensor 37, the above blower voltage, the solar radiation amount detected by the solar radiation sensor 51, and the like, and the target interior temperature (the set temperature) in the vehicle which is set by the operating portion 53, and each operation mode is changed to control the temperature of the air blown out from the outlet 29 into this target outlet temperature TAO as described later.

Next, the changing control of the above respective operation modes by the controller 32 will be described with reference to FIG. 6 to FIG. 9.

(6) Changing Control of Operation Mode

Figure 6:
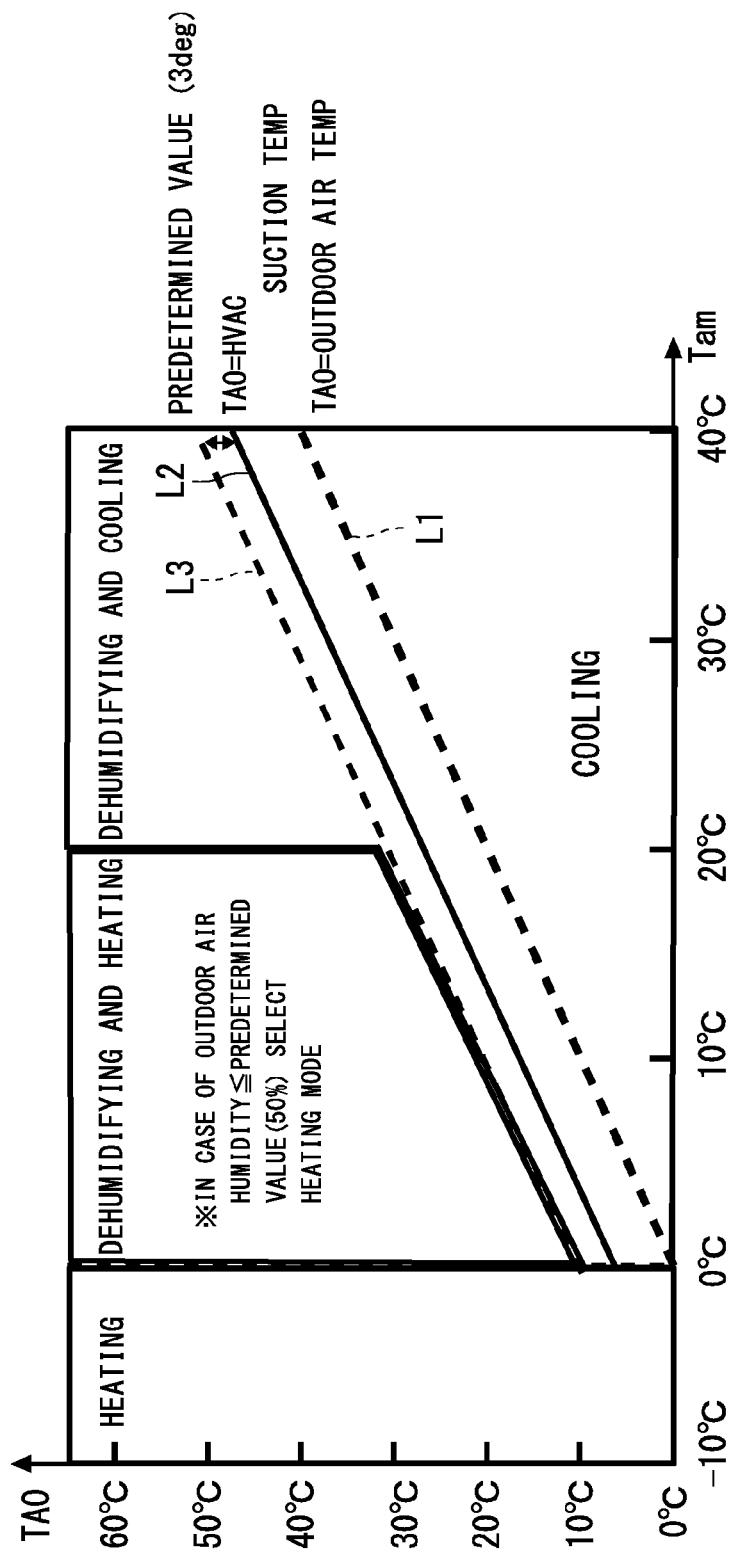
FIG. 6 is a diagram to explain an operation mode on startup of the controller of FIG. 2.

FIG. 6 shows the operation mode selected by the controller 32 of the vehicle air conditioner 1 on startup. On the startup, the controller 32 selects the operation mode on the basis of the outdoor air temperature Tam detected by the outdoor air temperature sensor 33 and the target outlet temperature TAO. That is, in FIG. 6, a broken line L1 is a line of the target outlet temperature TAO=the outdoor air temperature Tam, and a solid line L2 is a line of the target outlet temperature TAO=HVAC suction temperature (the temperature of the air sucked from the suction port 25 to the air flow passage 3). In addition, a broken line L3 is a line of hysteresis set on a predetermined value (three degrees) above the solid line.

First, in the embodiment, when the outdoor air temperature Tam is 0° C. or less on the startup, the controller 32 selects the heating mode. In addition, when the outdoor air temperature Tam is higher than 0° C. and the target outlet temperature TAO is the HVAC suction temperature or less, the controller selects the cooling mode. Furthermore, when the outdoor air temperature Tam is higher than 0° C. and is a predetermined value (e.g., 20° C. or the like) or less and when the target outlet temperature TAO is higher than the HVAC suction temperature, the controller selects the dehumidifying and heating mode, and further, when the outdoor air temperature Tam is higher than the predetermined value, the controller selects the dehumidifying and cooling mode. It is to be noted that when the outdoor air humidity detected by the outdoor air humidity sensor 34 is a predetermined value (e.g., 50% or the like) or less on conditions for the selection of the dehumidifying and heating mode, the controller selects the heating mode.

Figure 7:
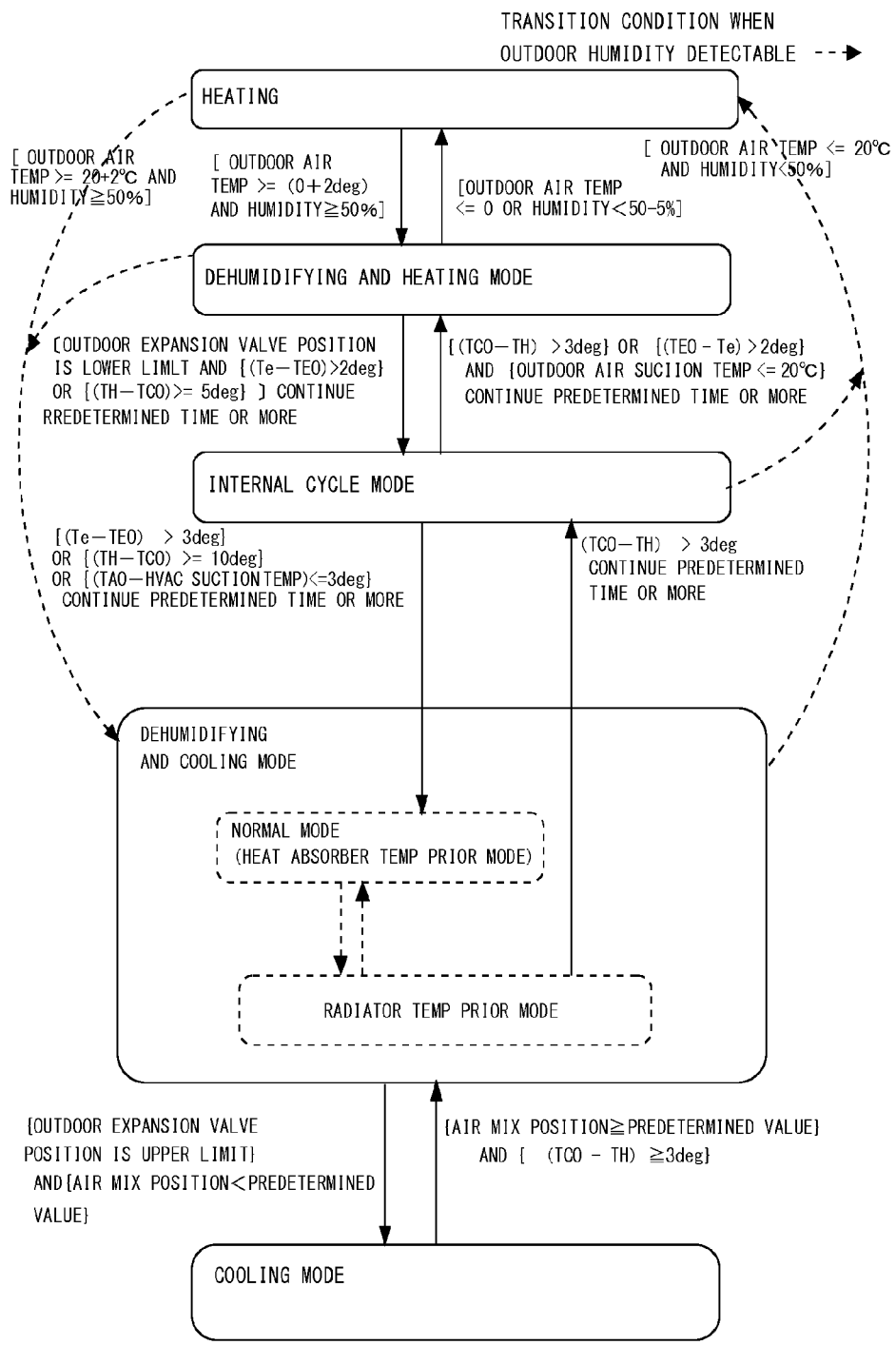
FIG. 7 is a diagram to explain changing control of the operation mode by the controller of FIG. 2.

Next, FIG. 7 shows one example of the operation mode changing control by the controller 32 after the start. When the controller 32 executes the above heating mode, the controller shifts to the dehumidifying and heating mode, in a case where the outdoor air temperature Tam rises to, for example, 2° C. which is two degrees higher than 0° C., or more and the outdoor air humidity rises to, for example, 50% or more, on the basis of the outdoor air temperature sensor 33 and the outdoor air humidity sensor 34. In addition, when the controller executes the heating mode, the controller skips over the dehumidifying and heating mode to the dehumidifying and cooling mode, in a case where the outdoor air temperature Tam is higher than 0° C. mentioned above and rises to, for example, 22° C. which is two degrees higher than 20° C., or more and the outdoor air humidity similarly rises to 50% or more.

In addition, when the controller 32 executes the above dehumidifying and heating mode and when the outdoor air temperature Tam lowers to 0° C. or less and the outdoor air humidity lowers to be less than, for example, 45% which is 5% lower than 50%, the controller shifts to the heating mode.

In addition, when the controller 32 executes the dehumidifying and heating mode, the controller shifts to the above internal cycle mode, in a case where the valve position of the outdoor expansion valve 6 is the abovementioned lower limit of controlling (e.g., a state where the refrigerant cannot be squeezed any more) and there is continued for a predetermined time or more a state where the heat absorber temperature Te-the heat absorber target temperature TEO is, for example, two degrees or more (i.e., a state where the heat absorption in the heat absorber 9 runs short) or a state where the radiator temperature TH-the radiator target temperature TCO is, for example, five degrees or more (i.e., a state where the heat radiation in the radiator 4 becomes excessive).

In addition, when the controller 32 executes the internal cycle mode, the controller shifts to the normal mode (a heat absorber temperature prior mode) of the dehumidifying and cooling mode, in a case where there is continued for a predetermined time or more a state where the heat absorber temperature Te-the heat absorber target temperature TEO is larger than, for example, three degrees larger than two degrees mentioned above (i.e., a state where the heat absorption in the heat absorber 9 further runs short) or a state where the radiator temperature TH-the radiator target temperature TCO is, for example, ten degrees or more which is larger than five degrees mentioned above (i.e., a state where the heat radiation in the radiator 4 further becomes excessive) or a state where the target outlet temperature TAO-the HVAC suction temperature is, for example, three degrees or less.

It is to be noted that when the controller executes the above dehumidifying and heating mode, the controller 32 may shift directly to the dehumidifying and cooling mode without shifting to the internal cycle mode, in the state where the heat absorption in the heat absorber 9 runs short further from conditions for the shift from the above internal cycle mode to the dehumidifying and cooling mode, the case where the heat radiation in the radiator 4 further becomes excessive, or the like. In consequence, it is possible to more rapidly cope with changes of environmental conditions, and the like.

In addition, the controller 32 changes and executes the normal mode and the radiator temperature prior mode in this dehumidifying and cooling mode, but these normal mode and radiator temperature prior mode will be described later in detail. Furthermore, when the controller 32 executes the radiator temperature prior mode in this dehumidifying and cooling mode and when the radiator target temperature TCO−the radiator temperature TH is larger than, for example, three degrees (i.e., the heat radiation in the radiator 4 runs short) and this state is continued for the predetermined time or more, the controller shifts to the internal cycle mode.

In addition, when the controller 32 executes the internal cycle mode, the controller shifts to the dehumidifying and heating mode, in a case where there is continued for a predetermined time or more a state where the radiator target temperature TCO−the radiator temperature TH is larger than, for example, three degrees (i.e., the heat radiation in the radiator 4 runs short) or the heat absorber target temperature TEO−the heat absorber temperature Te is larger than, for example, two degrees (i.e., the heat absorption in the heat absorber 9 is excessive) and the HVAC suction temperature (the outdoor air suction temperature) is, for example, 20° C. or less while the outdoor air is introduced.

It is to be noted that when the controller executes this internal cycle mode, the controller 32 may shift directly to the heating mode without shifting to the dehumidifying and heating mode, in the state where the heat radiation in the radiator 4 runs short further from the conditions for the shift to the above dehumidifying and heating mode, the case where the heat absorption in the heat absorber 9 further become excessive, or the like. In consequence, it is possible to more rapidly cope with the changes of the environmental conditions, and the like in the same manner as mentioned above.

Furthermore, when the controller 32 executes the dehumidifying and cooling mode and when the valve position of the outdoor expansion valve 6 is the abovementioned upper limit of controlling (i.e., a state where the refrigerant is passed as it is) and the air mix damper opening SW of the air mix damper 28 is smaller than a predetermined value, the controller shifts to the cooling mode.

Additionally, when the controller 32 executes this cooling mode and when the air mix damper opening SW is the predetermined value or more and the radiator target temperature TCO−TH is, for example, three degrees or more (i.e., the heat radiation in the radiator 4 runs short), the controller shifts to the dehumidifying and cooling mode.

When the controller 32 changes the operation mode in this manner, it is possible to accurately change the operation mode among the dehumidifying and heating mode, the internal cycle mode and the dehumidifying and cooling mode in accordance with a situation where the heat radiation in the radiator 4 or the heat absorption in the heat absorber 9 runs short or becomes excessive on conditions such as the environment of the vehicle and the set temperature.

In addition, it is possible to accurately change the operation mode among the heating mode, the dehumidifying and heating mode and the dehumidifying and cooling mode in accordance with an outdoor air environment, and it is also possible to shift from the heating mode directly to the dehumidifying and cooling mode in a situation where the temperature further rises in the outdoor air environment. Furthermore, it is possible to accurately change the operation mode between the cooling mode and the dehumidifying and cooling mode in accordance with a control situation of the outdoor expansion valve 6 or the situation of the heat radiation of the radiator 4.

(6-1) Other Operation Mode Changing Control

Figure 8:
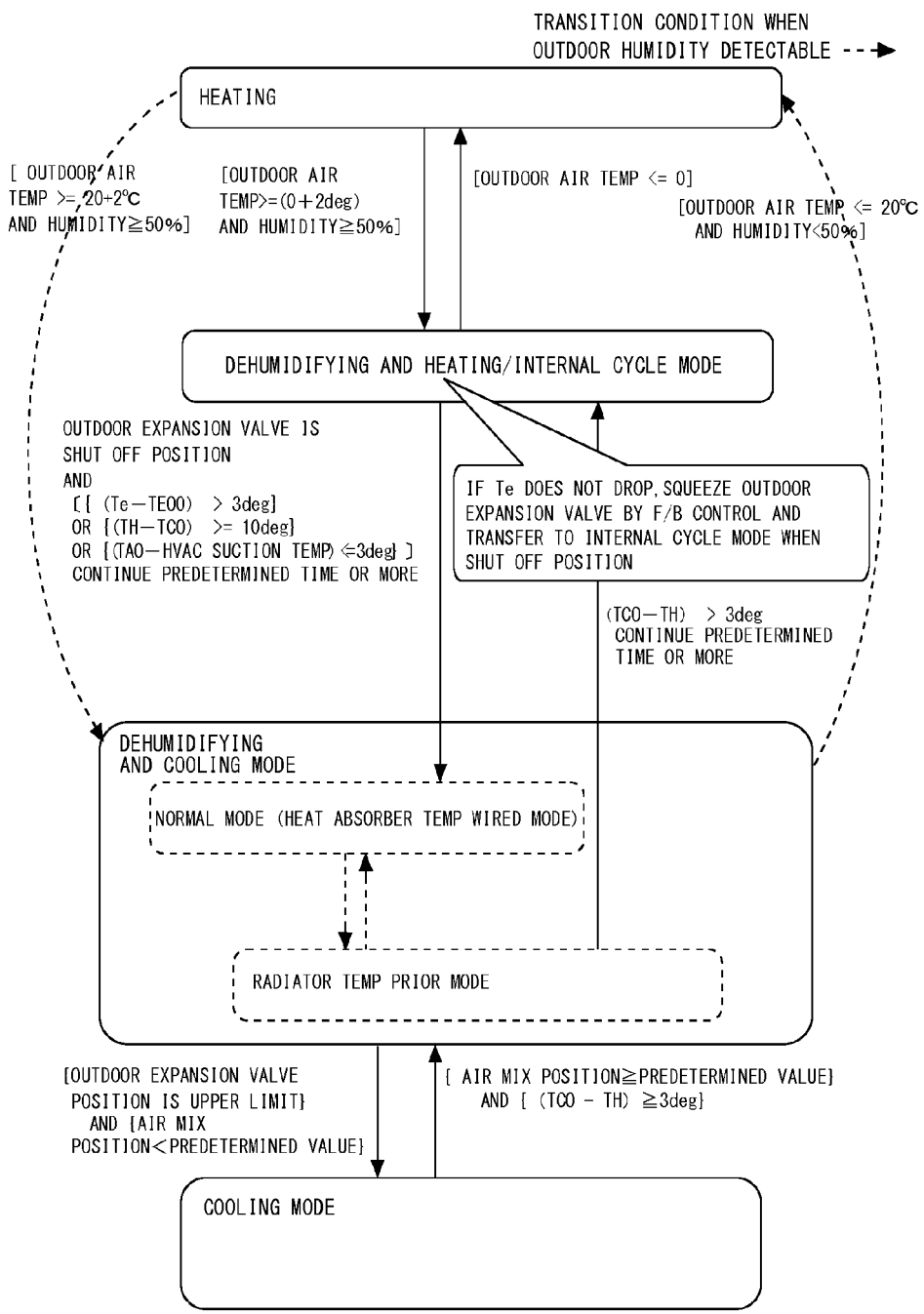
FIG. 8 is a diagram to explain another example of the changing control of the operation mode by the controller of FIG. 2.

It is to be noted that as described above, it can be considered that the internal cycle mode is the state where the outdoor expansion valve 6 is shut off by the control of the outdoor expansion valve 6 in the dehumidifying and heating mode. FIG. 8 shows one example of the operation mode changing control by the controller 32 after the start in the case of a control logic of the outdoor expansion valve 6 which shifts from the dehumidifying and heating mode to the internal cycle mode as it is.

In this case, the internal cycle mode is included in the dehumidifying and heating mode. In addition, conditions for the shift from the dehumidifying and heating mode to the dehumidifying and cooling mode are similar to the abovementioned conditions for the shift from the internal cycle mode to the dehumidifying and cooling mode.

(6-2) Indoor/Outdoor Air Control

Next, FIG. 9 shows one example of the control of the suction changing damper 26 by the controller 32. As described above, the suction changing damper 26 changes the outdoor air introducing mode to introduce the outdoor air into the air flow passage 3 and the indoor air circulating mode to introduce the air into the vehicle, but such indoor/outdoor air control varies on the startup and in the stable condition after the start.

That is, on the startup of the vehicle air conditioner 1 (an absolute value of a difference between a set interior temperature and the interior temperature is a predetermined value or less), when the controller 32 executes the heating mode or the dehumidifying and heating mode (including the internal cycle mode), the controller transfers the suction changing damper 26 to the outdoor air introducing mode, in a case where the outdoor air temperature obtained from the outdoor air temperature sensor 33 is not less than the indoor air temperature obtained from the indoor air temperature sensor 37 (i.e., at least a case where the outdoor air temperature is higher than an interior temperature is included), or an interior humidity obtained from the indoor air humidity sensor 38 is higher than the outdoor air humidity obtained from the outdoor air humidity sensor 34. Furthermore, the controller transfers the suction changing damper to the indoor air circulating mode, in a case where the interior temperature is higher than the outdoor air temperature or the outdoor air humidity is not less than the interior humidity (i.e., at least a case where the outdoor air humidity is higher than the interior humidity is included).

In addition, when the controller 32 executes the cooling mode or the dehumidifying and cooling mode on the startup, the controller transfers the suction changing damper 26 to the indoor air circulating mode, in a case where the outdoor air temperature is not less than the indoor air temperature (i.e., at least a case where the outdoor air temperature is higher than the interior temperature is included) or the outdoor air humidity is not less than the indoor air humidity (i.e., at least a case where the outdoor air humidity is higher than the interior humidity is included). Furthermore, the controller transfers the suction changing damper to the outdoor air introducing mode, in a case where the interior temperature is higher than the outdoor air temperature or the interior humidity is higher than the outdoor air humidity.

On the other hand, in the stable condition after the start (the interior temperature is substantially equal to the set temperature), the controller 32 transfers the suction changing damper 26 to the outdoor air introducing mode, in a case where the carbon dioxide concentration in the vehicle interior which is obtained from the indoor air $CO_2$ concentration sensor 39 is high and is a predetermined value or more, or the indoor air circulating mode is continued for the predetermined time or more (the indoor air introducing time is a predetermined value or more), or the interior humidity is higher than the outdoor air humidity, or the target outlet temperature TAO which is the target value of the temperature of the air blown out into the vehicle interior is the same as or close to the outdoor air temperature (a difference α). Furthermore, the controller transfers the suction changing damper to the indoor air circulating mode, in a case other than the above cases, i.e., in a case where the concentration of carbon dioxide in the vehicle interior is lower than the predetermined value, or the outdoor air humidity is not less than the indoor air humidity, or the outdoor air temperature is noticeably different from the target outlet temperature TAO (the difference is larger than α).

When the suction changing damper 26 is controlled in this manner and the heating mode or the dehumidifying and heating mode is executed on the startup, the outdoor air introducing mode and the indoor air circulating mode are accurately changed in accordance with the outdoor air environment, so that it is possible to effectively utilize the heat in the outdoor air for the heating in the vehicle. In addition, when the cooling mode or the dehumidifying and cooling mode is executed on the startup, the outdoor air introducing mode and the indoor air circulating mode are accurately changed in accordance with the outdoor air environment, so that it is possible to eliminate a bad influence of the heat in the outdoor air on the cooling in the vehicle, or effectively utilize cold in the outdoor air for the cooling in the vehicle. Furthermore, it is possible to accurately change the outdoor air introducing mode and the indoor air circulating mode in accordance with the carbon dioxide concentration in the vehicle interior or the target outlet temperature in the stable condition after the start.

It is to be noted that in the above embodiment, the suction changing damper 26 changes the outdoor air introducing mode to introduce the outdoor air into the air flow passage 3 and the indoor air circulating mode to introduce the air in the vehicle interior (the indoor air), but the present invention is not limited to this example, and between a state where all the outdoor air is introduced and a state where all the air in the vehicle interior is introduced, control may be executed to continuously regulate a mixture degree of the outdoor air and the indoor air (an amount of the indoor air to be mixed). Also in this case, a direction of the control on the conditions of the outdoor air temperature, the indoor air temperature, the outdoor air humidity, the indoor air humidity and the carbon dioxide concentration in the vehicle interior is similar to that of the above embodiment.

Furthermore, in accordance with the above changing control of the operation mode, according to the vehicle air conditioner 1 of the embodiment, it is possible to select and change the optimum operation mode on conditions such as the environment of the vehicle and the set temperature so that a desirable air conditioning performance can be exerted, and the desirable air conditioning performance is exerted so that comfortable air condition in the vehicle can be realized.

(7) Normal Mode and Radiator Temperature Prior Mode in Dehumidifying and Cooling Mode Next, the changing control of the normal mode (the heat absorber temperature prior mode) and the radiator temperature prior mode in the abovementioned dehumidifying and cooling mode will be described with reference to FIG. 10 to FIG. 22. As described above, in the normal mode of the dehumidifying and cooling mode, the revolution number (the target number of revolution TGNCc) of the compressor 2 is controlled by the temperature of the heat absorber 9 (the heat absorber temperature Te). Therefore, even in a state (a squeezed state) where the heat absorber temperature Te converges at the heat absorber target temperature TEO and the valve position of the outdoor expansion valve 6 has the abovementioned lower limit of controlling, the high pressure of the refrigerant circuit R does not rise, and the radiator pressure PCI does not reach the radiator target pressure PCO. In this case, the temperature of the radiator 4 (the radiator temperature TCO) causes shortage.

Figure 10:
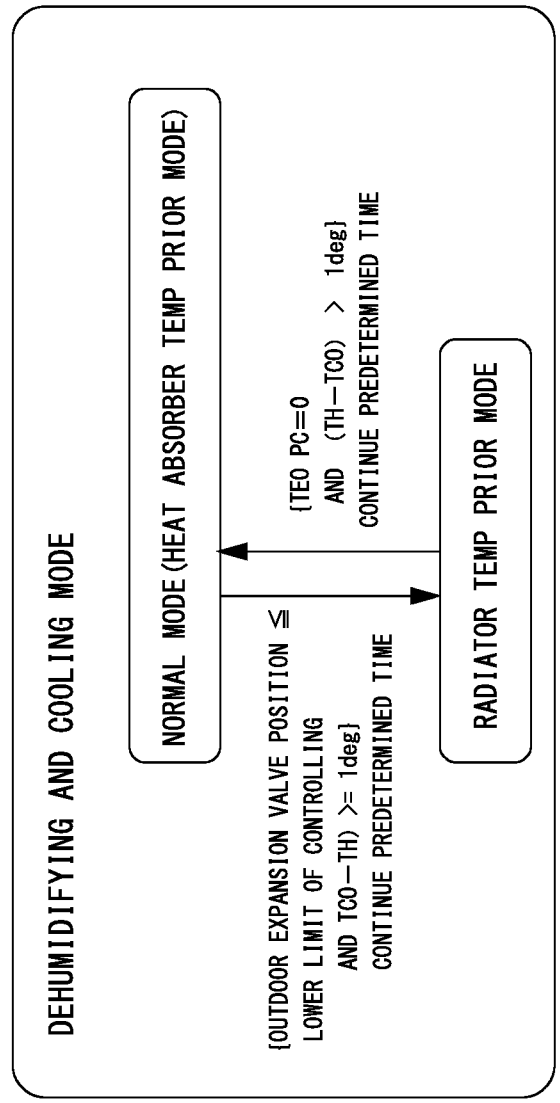
FIG. 10 is a diagram to explain the changing control of a normal mode and a radiator temperature prior mode in a dehumidifying and cooling mode by the controller of FIG. 2.

To solve the problem, in such a case, the controller 32 executes the radiator temperature prior mode in which the heat absorber target temperature TEO is lowered to raise the revolution number of the compressor 2, the capability of the compressor 2 is enlarged to raise the high pressure, and the radiator pressure PCI is raised to the radiator target pressure PCO. FIG. 10 shows the mode changing control between the normal mode and the radiator temperature prior mode in the dehumidifying and cooling mode. When the controller 32 executes the dehumidifying and cooling mode (the normal mode in which the heat absorber temperature is prioritized), the controller shifts to the radiator temperature prior mode, in a case where there is continued for a predetermined time or more a state where the valve position of the outdoor expansion valve 6 is the above lower limit of controlling or less and the radiator target temperature TCO−the radiator temperature TH is, for example, one degree or more (i.e., the heat radiation in the radiator 4 runs short).

Figure 11:
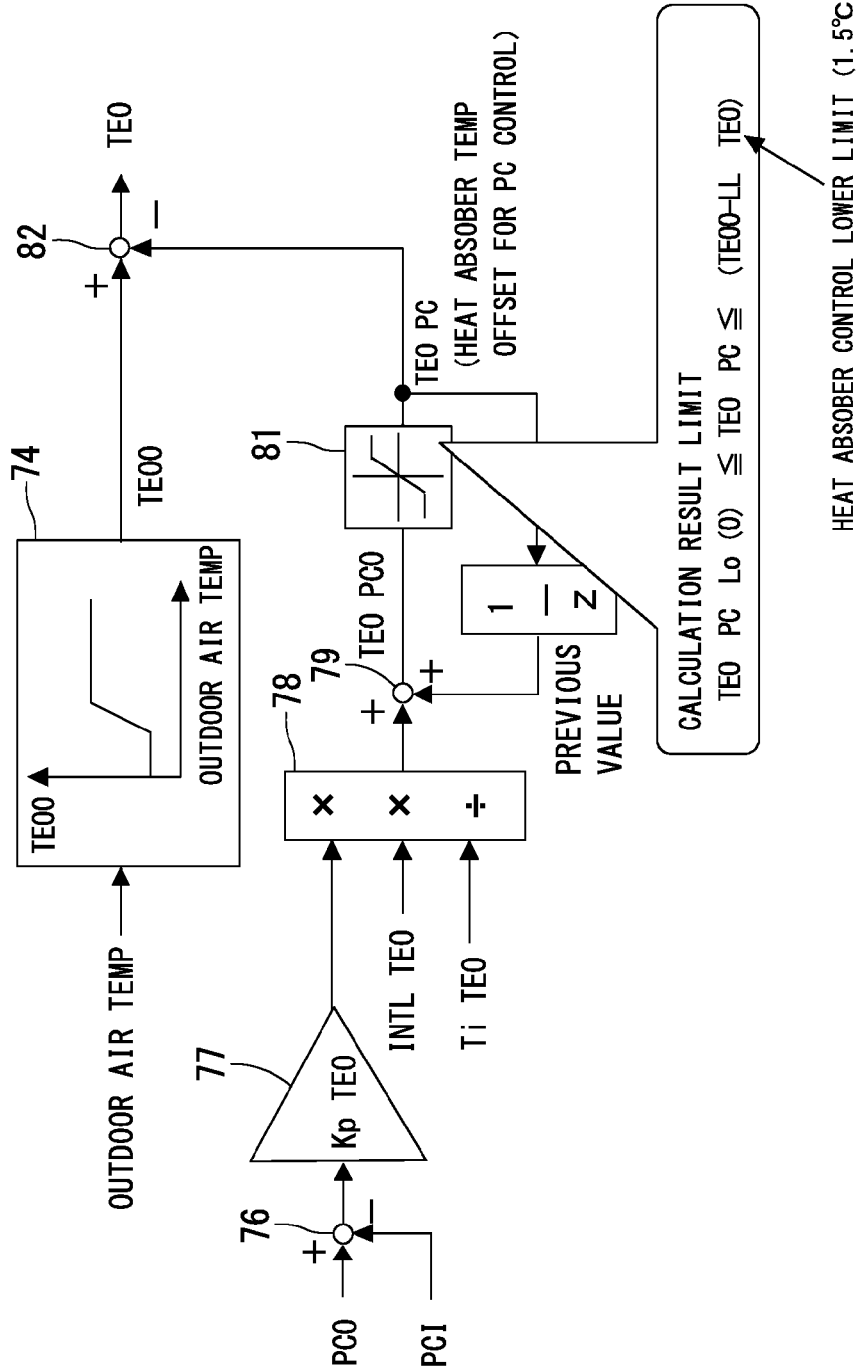
FIG. 11 is a control block diagram of the controller in the radiator temperature prior mode of FIG. 10.

FIG. 11 shows one example of a control block diagram of the controller 32 in this radiator temperature prior mode. That is, 74 of FIG. 11 is a data table of a heat absorber basic target temperature TEO0, and this table is set correspondingly to the outdoor air temperature beforehand. It is to be noted that this heat absorber basic target temperature TEO0 is a heat absorber temperature to obtain the humidity required for the environment of the outdoor air temperature. Usually, the heat absorber target temperature TEO is determined on the basis of the data table 74, but in this radiator temperature prior mode, the controller 32 makes a correction on the basis of an integrated value of a difference between the radiator target pressure PCO and the radiator pressure PCI.

That is, the radiator target pressure PCO and the radiator pressure PCI obtained from the radiator pressure sensor 47 are input into a subtracter 76, and a deviation e is amplified by an amplifier 77 and input into a calculator 78. The calculator 78 performs an integrating calculation of a heat absorber temperature offset for a predetermined integrating period and integrating time, and an integrated value TEOPCO of the heat absorber temperature offset added to a previous value by an adder 79 is calculated. Furthermore, a limit setting section 81 attaches limits of the upper limit of controlling and the lower limit of controlling, and then a heat absorber temperature offset TEOPC is determined.

The heat absorber temperature offset TEOPC is subtracted from the heat absorber basic target temperature TEO0 in a subtracter 82, and the heat absorber target temperature TEO is determined. Therefore, as compared with the normal mode, the heat absorber target temperature TEO is lowered as much as the heat absorber temperature offset TEOPC, whereby the compressor target number of revolution TGNCc of the compressor 2 is raised, the revolution number of the compressor 2 rises, the capability of the compressor 2 enlarges to raise the high pressure, and the radiator pressure PCI rises, so that the required temperature TH of the radiator 4 can be obtained.

Figure 12:
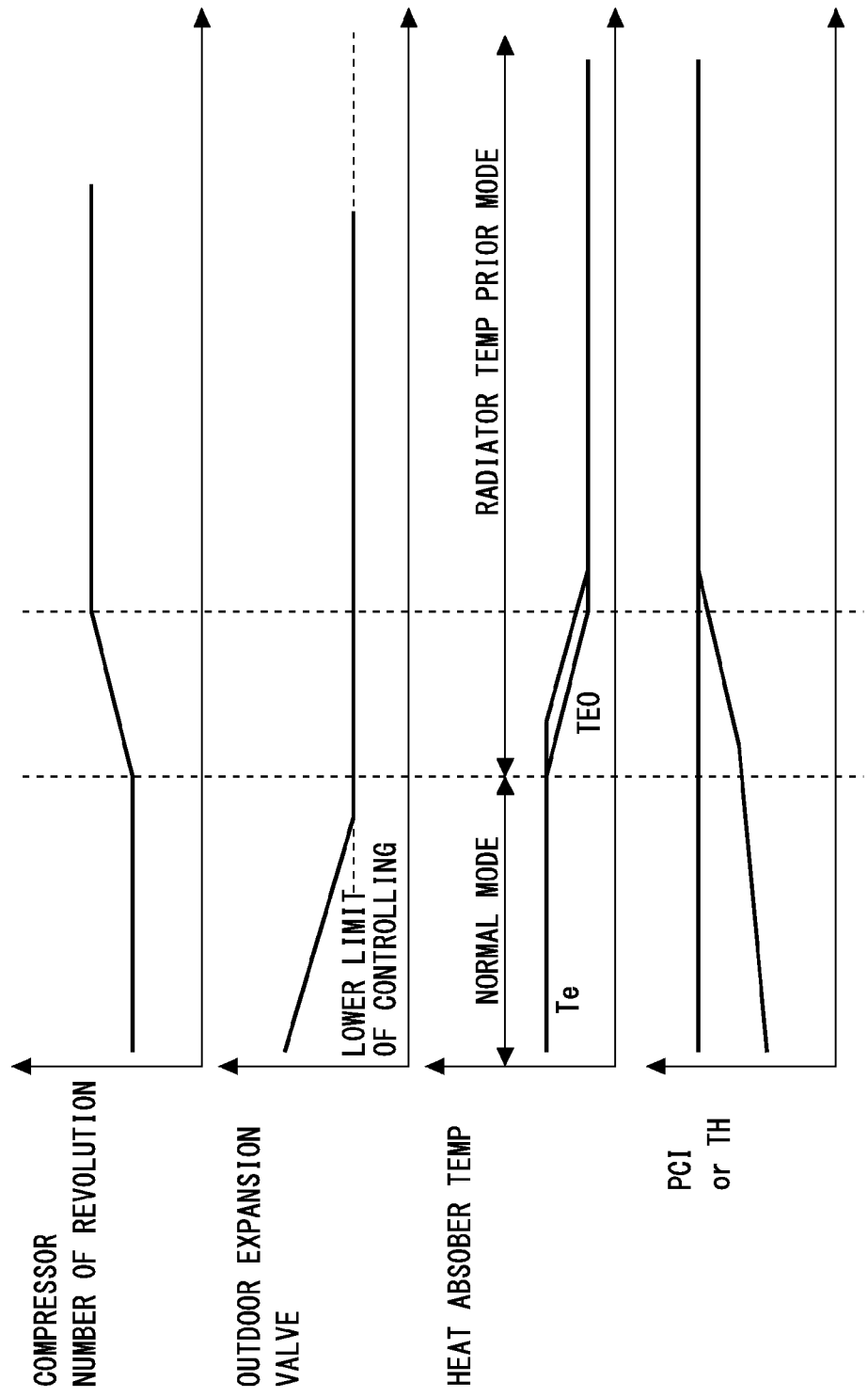
FIG. 12 is a timing chart showing the changing control of the normal mode and the radiator temperature prior mode in the dehumidifying and cooling mode of FIG. 10.

It is to be noted that the limit setting section 81 limits the heat absorber temperature offset TEOPC in a range where the heat absorber 9 is not frosted. FIG. 12 is a timing chart to explain this behavior. It is seen that when the situation where the outdoor expansion valve 6 has the lower limit of controlling shifts to the radiator temperature prior mode on the abovementioned conditions in a state where the heat absorber temperature Te converges at the heat absorber target temperature TEO and the revolution number of the compressor 2 is low in the normal mode, the revolution number of the compressor 2 rises, the heat absorber temperature Te lowers, and the radiator pressure PCI (or the radiator temperature TH) rises.

On the other hand, in this radiator temperature prior mode, when a state where the heat absorber temperature offset TEOPC mentioned above becomes zero and the radiator temperature TH−the radiator target temperature TCO is higher than, for example, one degree (i.e., the heat radiation of the radiator 4 is excessive) is continued for a predetermined time or more, the controller 32 returns from the radiator temperature prior mode to the normal mode.

It is to be noted that this changing control of the normal mode and the radiator temperature prior mode is similarly applicable also to a case where the revolution number of the compressor 2 is controlled by using the compressor target number of revolution TGNCc calculated for the cooling mode and the dehumidifying and cooling mode in the internal cycle mode.

Consequently, in the dehumidifying and cooling mode or the internal cycle mode, when the temperature TH of the radiator 4 causes shortage even in a case where the temperature Te of the heat absorber 9 converges at the target value TEO and the valve position of the outdoor expansion valve 6 has the lower limit of controlling, the capability of the radiator/compressor 2 enlarges to raise the high pressure, and the amount of the refrigerant to be radiated in the radiator 4 is enlarged, so that the reheating by the radiator 4 in the dehumidifying and cooling mode is acquired, thereby making it possible to acquire the air conditioning performance, and an effective range of the dehumidifying and cooling mode is enlarged, thereby making it possible to realize the comfortable air condition in the vehicle. In this case, the controller 32 corrects and lowers the heat absorber target temperature TEO in the range where the heat absorber 9 is not frosted, and hence it is possible to prevent occurrence of the frosting due to an excessive temperature drop of the heat absorber 9, so that energy saving can be achieved.

(7-1) Coordinated Controlling with Electric Heater

Figure 13:
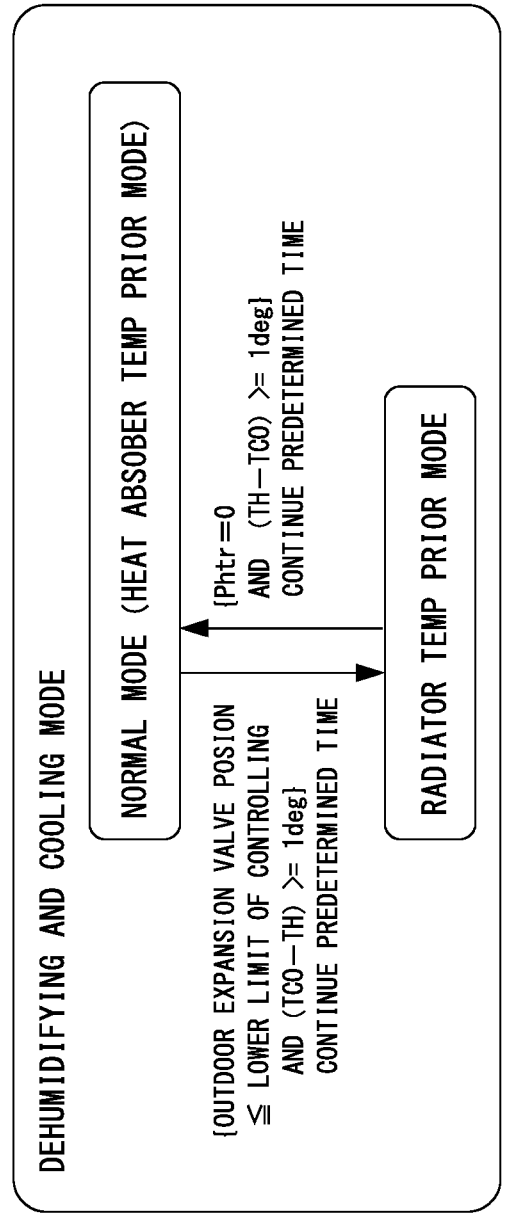
FIG. 13 is a diagram to explain another example of the changing control of the normal mode and the radiator temperature prior mode in the dehumidifying and cooling mode by the controller of FIG. 2.
Figure 14:
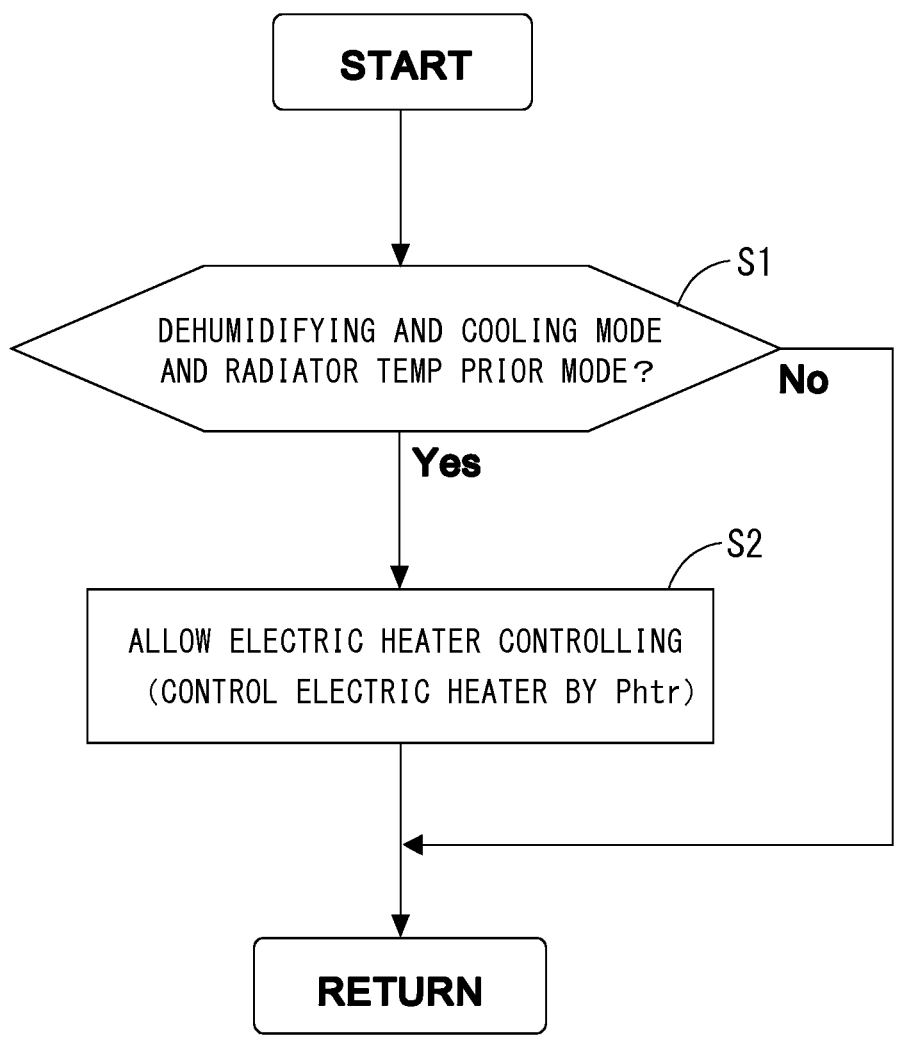
FIG. 14 is a flowchart to explain the changing control of FIG. 13.
Figure 15:
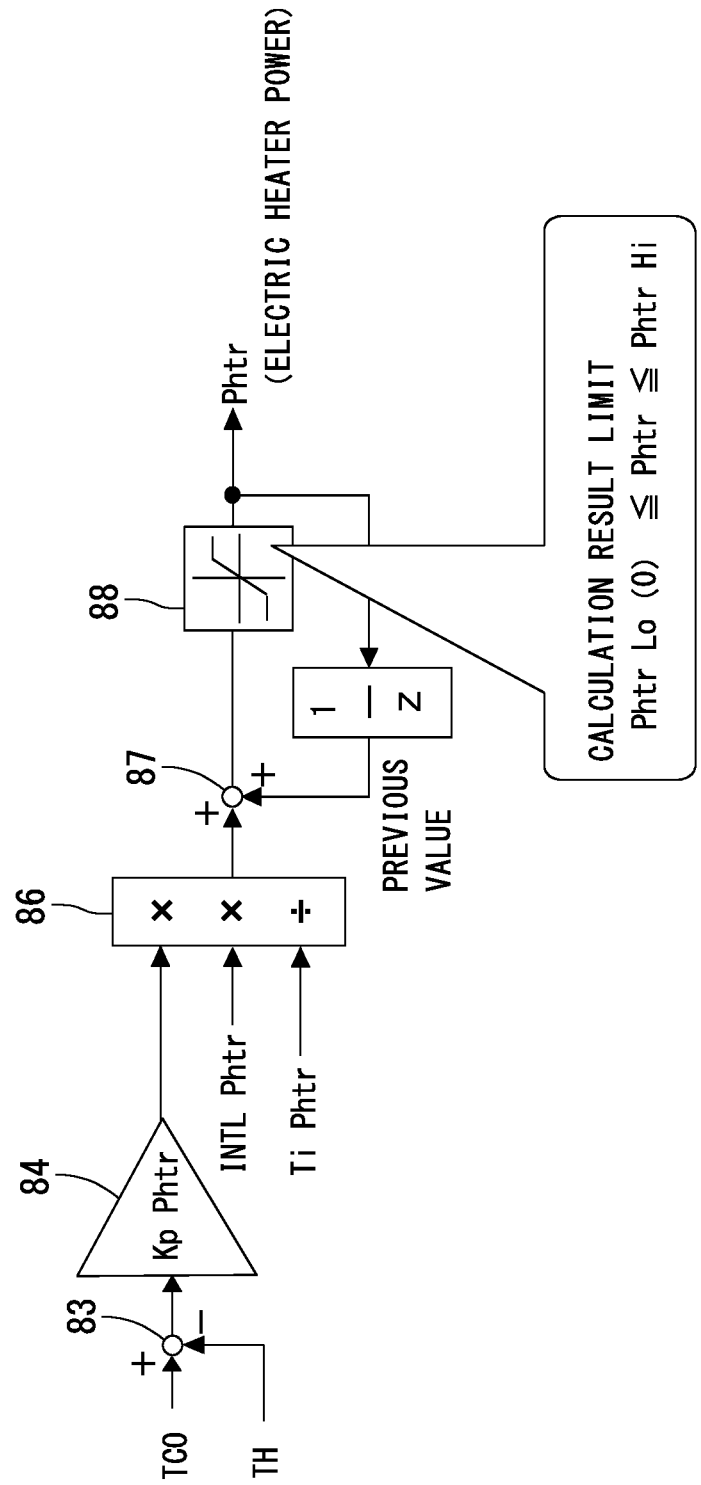
FIG. 15 is a control block diagram of the controller in the radiator temperature prior mode of FIG. 13.

Here, when the temperature TH of the radiator 4 does not rise to the radiator target temperature TCO even by the rise of the revolution number of the compressor 2 due to the lowering of the heat absorber target temperature TEO, the electric heater 57 may be utilized. FIG. 13 to FIG. 15 show control of the radiator temperature prior mode by the coordinated controlling with the electric heater 57. Also in this case, the conditions for the shift from the normal mode to the radiator temperature prior mode are similar to those of FIG. 10. FIG. 14 shows a flowchart of the controller 32 in this case. In step S1, it is judged whether or not the current mode is the dehumidifying and cooling mode and the radiator temperature prior mode, and when yes, the step advances to step S2, to allow the controlling of the electric heater 57.

FIG. 15 shows a control block diagram of the electric heater 57 by the controller 32 when the controlling of the electric heater 57 is allowed. That is, the radiator target temperature TCO (may be the radiator target pressure PCO) and the radiator temperature TH obtained from the radiator temperature sensor 46 (which may be the radiator pressure PCI) are input into a subtracter 83, and the deviation e is amplified by an amplifier 84 and input into a calculator 86. The calculator 86 performs an integrating calculation of an electric heater power Phtr for a predetermined integrating period and integrating time, and an integrated value of the electric heater power added to the previous value by the adder 87 is calculated. Furthermore, a limit setting section 88 attaches limits of an upper limit of controlling and a lower limit of controlling, and then the electric heater power Phtr is determined.

The controller 32 energizes the electric heater 57 in accordance with a control amount of the electric heater power Phtr to generate heat, and hence the shortage of the temperature of the radiator 4 is complemented by the electric heater 57, and it is possible to realize further comfortable air condition in the vehicle. It is to be noted that conditions for the return to the normal mode in this case include the electric heater power Phtr=0 in place of the abovementioned heat absorber temperature offset TEOPC=0 (FIG. 13).

(7-2) Coordinated Controlling with Indoor Blower (Blower Fan)

Figure 16:
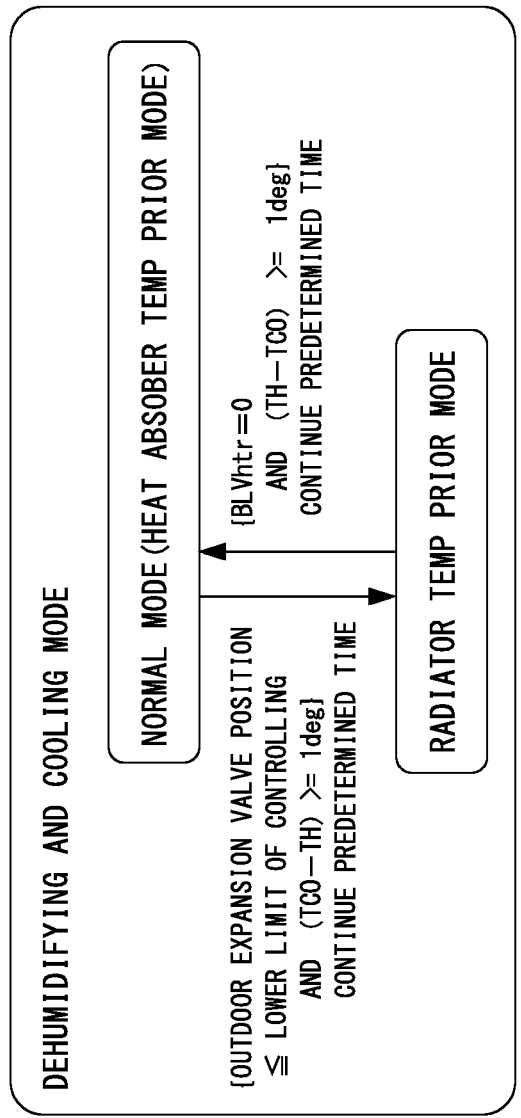
FIG. 16 is a diagram to explain still another example of the changing control of the normal mode and the radiator temperature prior mode in the dehumidifying and cooling mode by the controller of FIG. 2.
Figure 17:
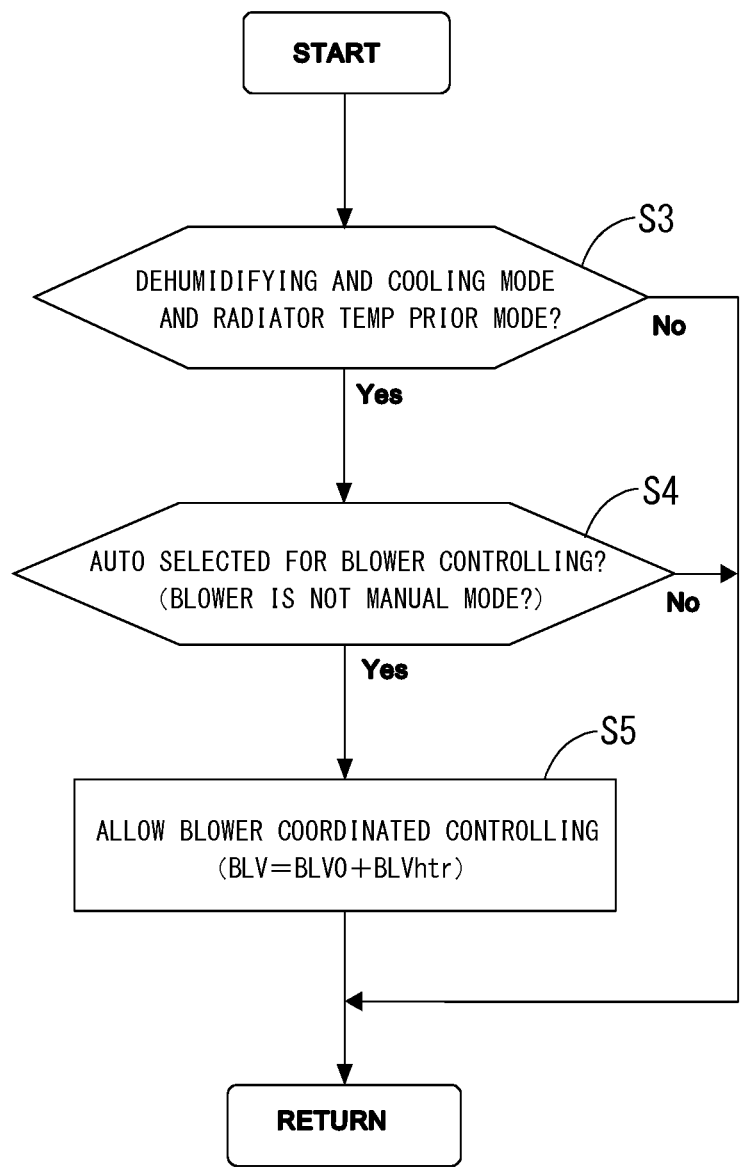
FIG. 17 is a flowchart to explain the changing control of FIG. 16.
Figure 18:
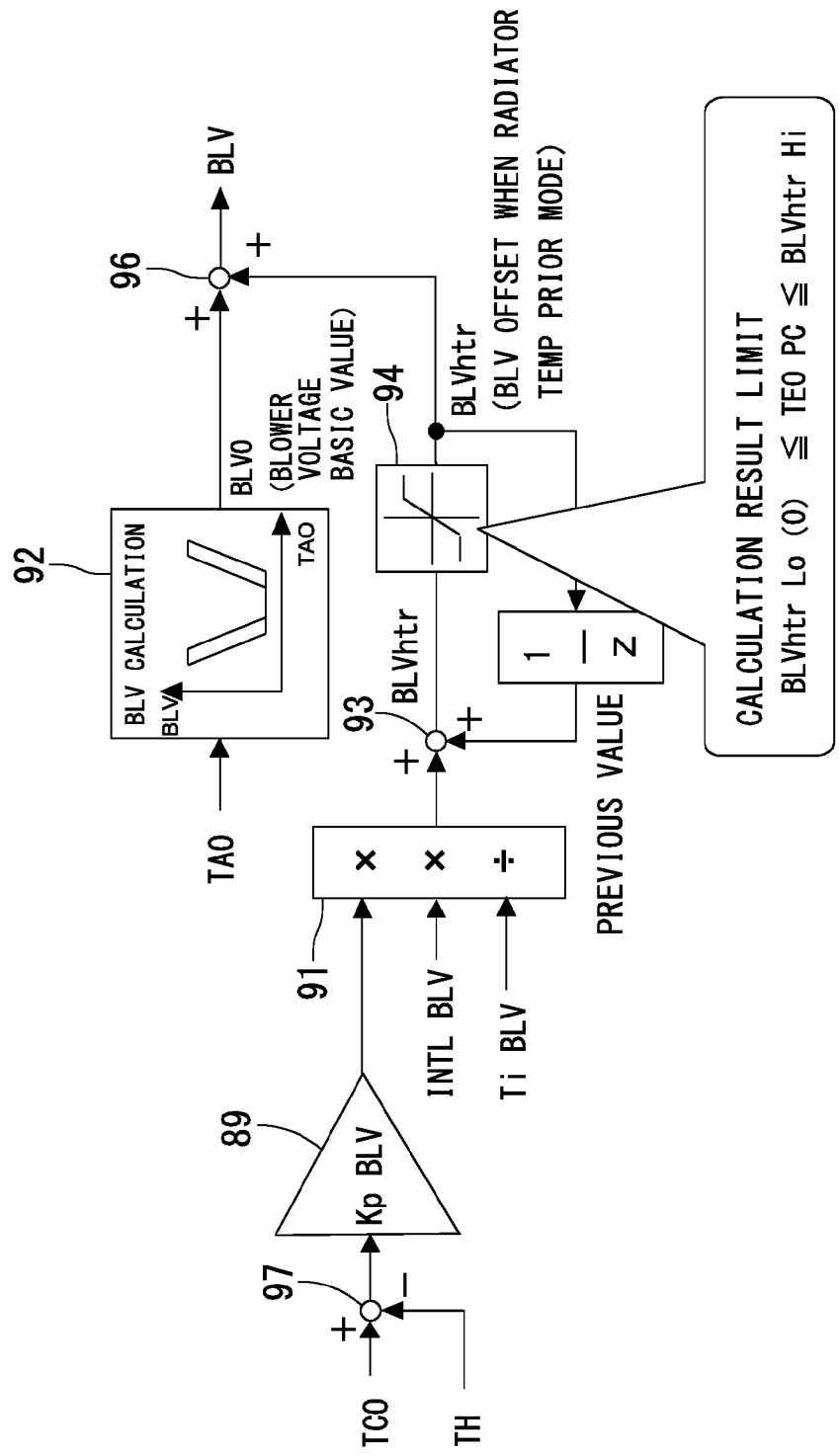
FIG. 18 is a control block diagram of the controller in the radiator temperature prior mode of FIG. 16.

In addition, when an air volume of the indoor blower 27 is raised, an amount of the heat to be absorbed in the heat absorber 9 increases, whereby the high pressure also rises to raise the radiator temperature TH. Therefore, in place of or in addition to this coordination with the electric heater 57, the indoor blower 27 may be coordinated to acquire the radiator temperature TH. FIG. 16 to FIG. 18 show the control of the radiator temperature prior mode by the coordination with the indoor blower 27. Also in this case, the conditions for the shift from the normal mode to the radiator temperature prior mode are similar to those of FIG. 10. FIG. 17 shows a flowchart of the controller 32 in this case. In step S3, it is judged whether or not the current mode is the dehumidifying and cooling mode and the radiator temperature prior mode, and when yes, the step advances to step S4 to judge whether or not AUTO for the controlling of the indoor blower 27 is selected (i.e., the mode is not a manual mode). In the case of AUTO, the step advances to step S5 to allow the coordinated controlling of the indoor blower.

FIG. 18 shows a control block diagram of the indoor blower 27 by the controller 32 when the coordinated controlling of the indoor blower (the blower fan) 27 is allowed. That is, 92 of FIG. 18 is a data table of a blower voltage basic value BLV0, and this table is set correspondingly to the target outlet temperature TAO beforehand. It is to be noted that this blower voltage basic value BLV0 is a blower voltage to obtain the air volume of the indoor blower 27 which is suitable for the target outlet temperature TAO. Usually, the blower voltage BLV is determined on the basis of the data table 92, but in this radiator temperature prior mode, the controller 32 makes a correction on the basis of an integrated value of a difference between the radiator target temperature TCO (may be the radiator target pressure PCO) and the radiator temperature TH (may be the radiator pressure PCI).

That is, the radiator target temperature TCO and the radiator temperature TH obtained from the radiator temperature sensor 46 are input into a subtracter 97, and the deviation e is amplified by an amplifier 89 and input into a calculator 91. The calculator 91 performs an integrating calculation of a blower voltage offset for a predetermined integrating period and integrating time, and an integrated value of the blower voltage offset added to the previous value by an adder 93 is calculated. Furthermore, a limit setting section 94 attaches limits of an upper limit of controlling and a lower limit of controlling, and then a blower voltage offset BLVhtr is determined.

The blower voltage offset BLVhtr is added to the blower voltage basic value BLV0 in an adder 96, and the blower voltage BLV is determined. Therefore, as compared with the normal mode, the blower voltage BLV is raised as much as the blower voltage offset BLVhtr, whereby the air volume of the indoor blower 27 enlarges, the amount of the heat to be absorbed in the heat absorber 9 enlarges, the high pressure rises to raise the radiator pressure PCI, and the temperature TH of the radiator 4 rises. In consequence, it is possible to further rapidly eliminate the shortage of the temperature of the radiator 4. It is to be noted that conditions for the return to the normal mode include the blower voltage offset BLVhtr=0 in place of the heat absorber temperature offset TEOPC=0 of FIG. 10 (FIG. 16).

(7-3) Coordinated Controlling with Indoor/Outdoor Air Control

Figure 19:
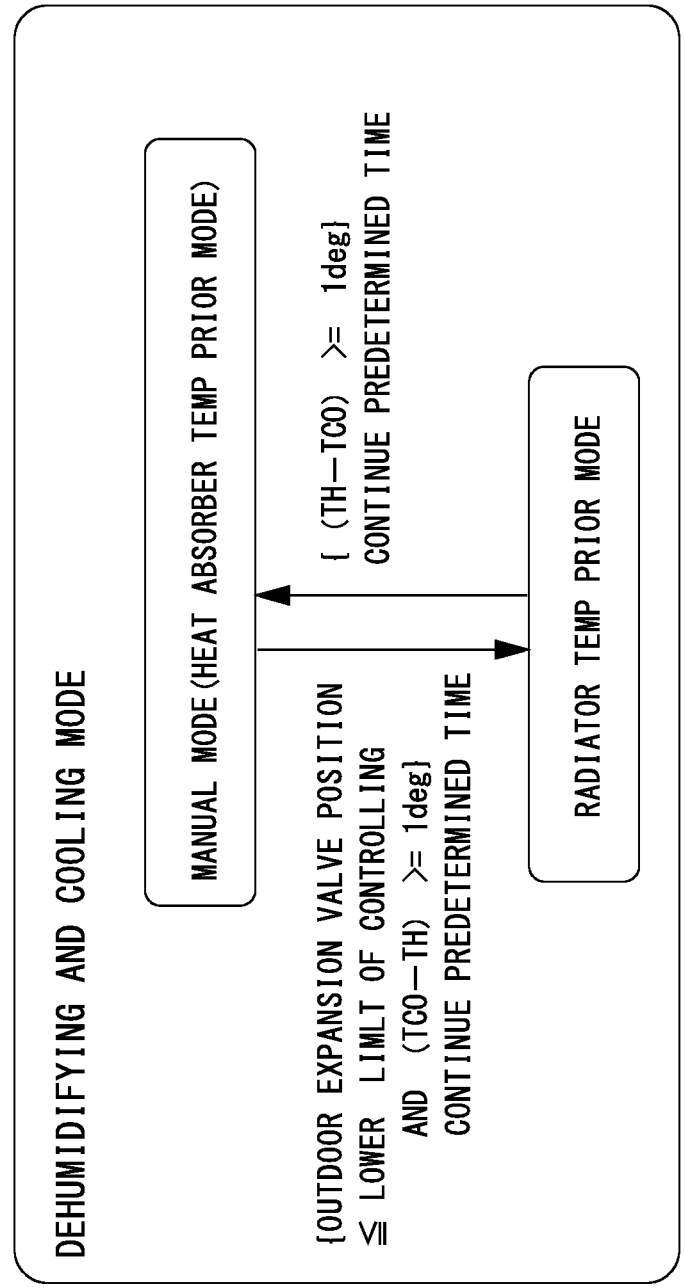
FIG. 19 is a diagram to explain a further example of the changing control of the normal mode and the radiator temperature prior mode in the dehumidifying and cooling mode by the controller of FIG. 2.
Figure 20:
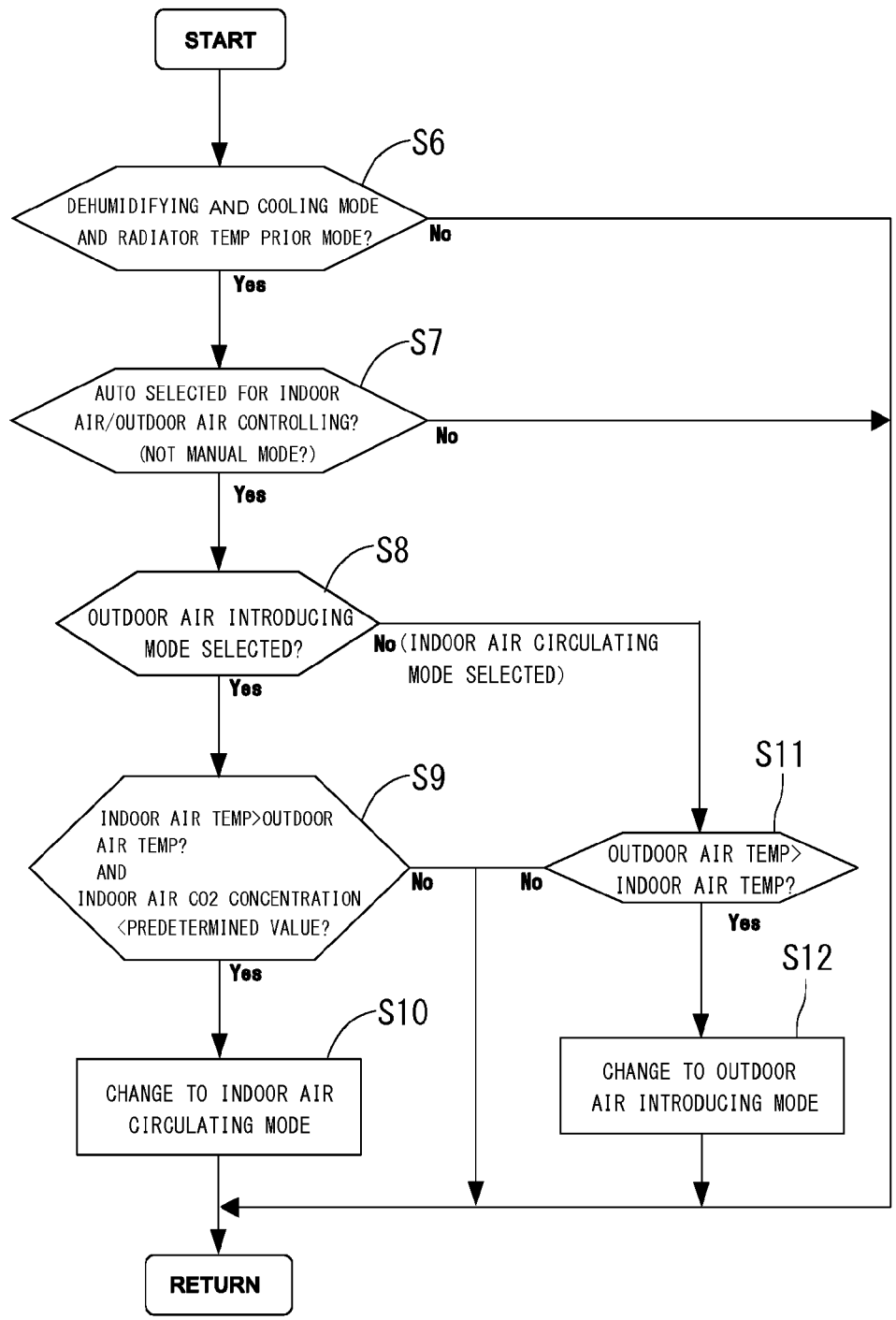
FIG. 20 is a flowchart to explain the changing control of FIG. 19.

In addition, indoor/outdoor air control of the outdoor air introduction and indoor air circulation may be coordinated to raise the radiator temperature TH. That is, when the air having a higher temperature in the indoor temperature (the indoor air temperature) and the outdoor air temperature is introduced into the air flow passage 3, the amount of the heat to be absorbed in the heat absorber 9 increases, whereby the high pressure also rises to raise the radiator temperature TH. Therefore, in place of or in addition to the above coordination with the electric heater 57 or the indoor blower 27, the indoor/outdoor air control by the suction changing damper 26 may be coordinated to acquire the radiator temperature TH. FIG. 19 and FIG. 20 show the control of the radiator temperature prior mode by this coordination with the indoor/outdoor air control.

Also in this case, the conditions for the shift from the normal mode to the radiator temperature prior mode are similar to those of FIG. 10. FIG. 20 shows a flowchart of the controller 32 in this case. In step S6, it is judged whether or not the current mode is the dehumidifying and cooling mode and the radiator temperature prior mode, and when yes, the step advances to step S7 to judge whether or not AUTO for the indoor/outdoor air control by the suction changing damper 26 is selected (i.e., the mode is not a manual mode). In the case of AUTO, the step advances to step S8 to judge whether or not the current mode is the outdoor air introducing mode. When the current mode is the outdoor air introducing mode, the controller 32 advances to step S9 to judge whether or not the interior temperature (the indoor air temperature) obtained from the indoor air temperature sensor 37 is higher than the outdoor air temperature obtained from the outdoor air temperature sensor 33 and the indoor air $CO_2$ concentration obtained from the indoor air $CO_2$ concentration sensor 39 is lower than a predetermined value. Furthermore, when the interior temperature is higher than the outdoor air temperature and the indoor air $CO_2$ concentration is lower than the predetermined value, the step advances to step S10 in which the suction changing damper 26 changes to the indoor air circulating mode.

When the indoor air circulating mode is present in the step S8 and when in the step S9, the outdoor air temperature is the interior temperature (the indoor air temperature) or more (i.e., the case where the outdoor air temperature is higher than the interior temperature is included) or the indoor air $CO_2$ concentration is the predetermined value or more, the step advances to step S11. In the step S11, the controller 32 judges whether or not the outdoor air temperature is higher than the interior temperature, and when the outdoor air temperature is higher, the step advances to step S12 in which the suction changing damper 26 changes to the outdoor air introducing mode. In consequence, the air having the higher temperature in the interior air and the outdoor air is passed through the heat absorber 9. Therefore, the amount of the heat to be absorbed in the heat absorber 9 is enlarged and the high pressure is raised, so that it is possible to further rapidly eliminate the temperature shortage of the radiator 4.

(7-4) Coordinated Controlling with Other Indoor/Outdoor Air Control

Figure 21:
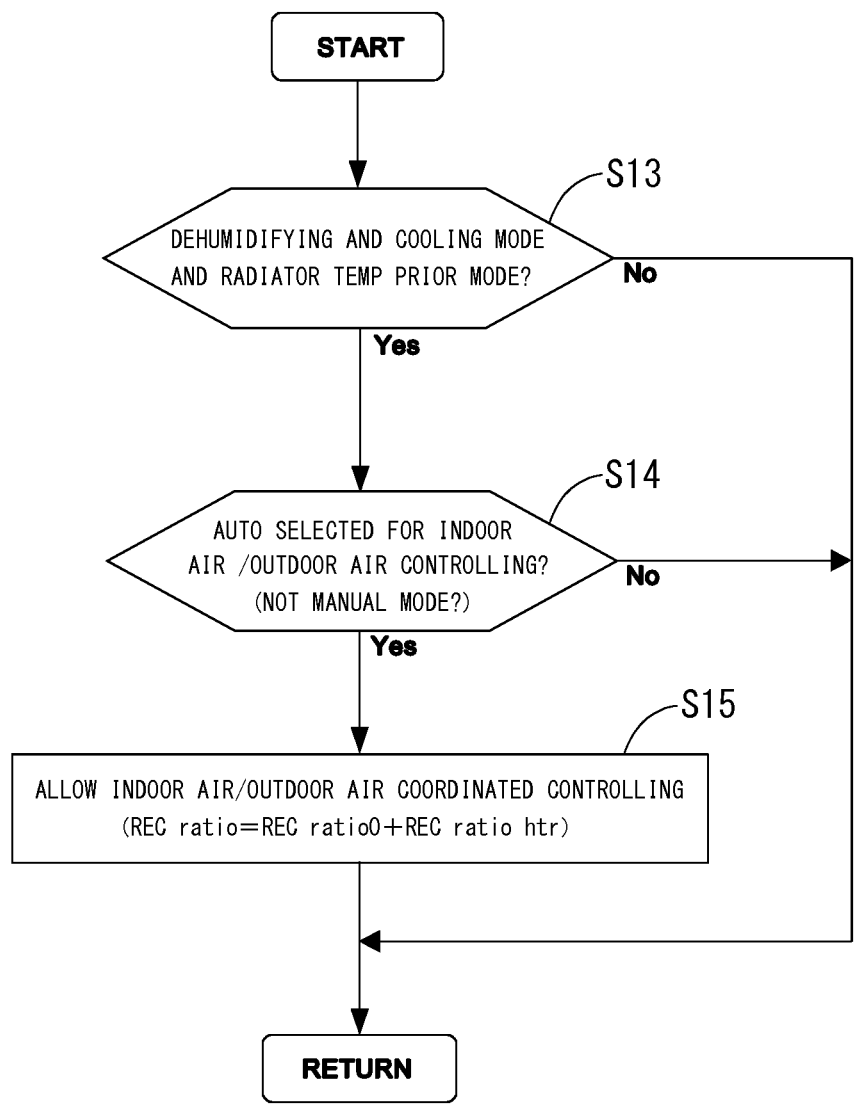
FIG. 21 is a flowchart to explain another example of the changing control of FIG. 19.

Here, there will be described the coordinated controlling in a case where an amount of the indoor air to be mixed with the outdoor air can be regulated in the above indoor/outdoor air control of the suction changing damper 26 with reference to FIG. 21 and FIG. 22. FIG. 21 shows a flowchart of the controller 32 in this case. In step S13, it is judged whether or not the current mode is the dehumidifying and cooling mode and the radiator temperature prior mode, and when yes, the step advances to step S14 to judge whether or not AUTO for the indoor/outdoor air control by the suction changing damper 26 is selected (i.e., the mode is not a manual mode). In the case of AUTO, the step advances to step S15 to allow the indoor/outdoor air coordinated controlling.

Figure 22:
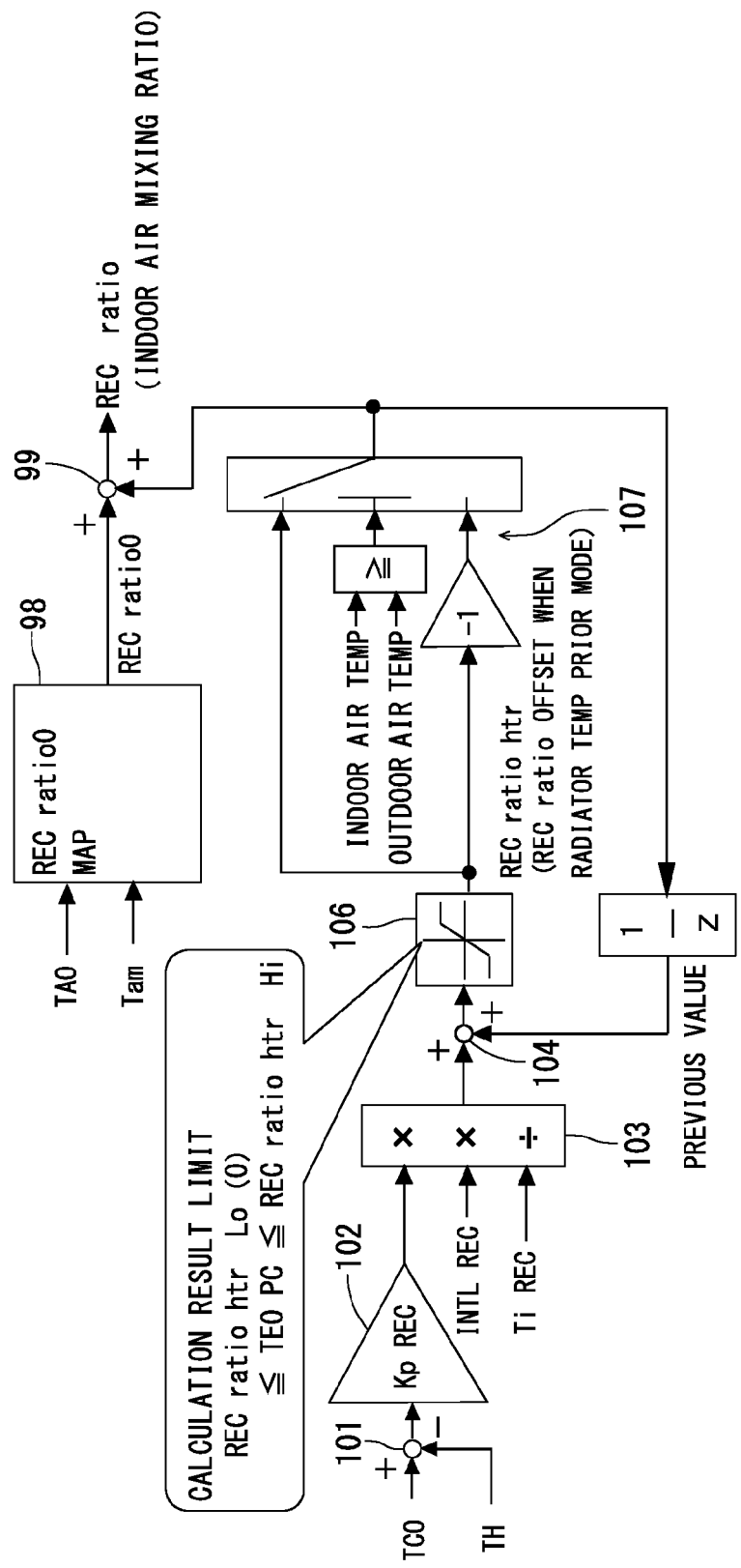
FIG. 22 is a control block diagram of the controller in the radiator temperature prior mode of FIG. 21.

FIG. 22 shows a control block diagram of the suction changing damper 26 by the controller 32 in a case where the indoor/outdoor air coordinated controlling by the suction changing damper 26 is allowed. That is, 98 of FIG. 22 is a data table of an indoor air mixing ratio basic value RECratio0, and in this table, a map on the basis of the target outlet temperature TAO and the outdoor air temperature Tam is set beforehand. It is to be noted that the indoor air mixing ratio basic value RECratio0 is an indoor air mixing ratio suitable for the target outlet temperature TAO and the outdoor air temperature Tam at this time. Usually, the indoor air mixing ratio RECratio is determined on the basis of the data table 98, but in this radiator temperature prior mode, the controller 32 makes a correction on the basis of an integrated value of a difference between the radiator target temperature TCO (may be the radiator target pressure PCO) and the radiator temperature TH (may be the radiator pressure PCI).

That is, the radiator target temperature TCO and the radiator temperature TH obtained from the radiator temperature sensor 46 are input into a subtracter 101, and the deviation e is amplified by an amplifier 102 and input into a calculator 103. The calculator 103 performs an integrating calculation of an indoor air mixing ratio offset for a predetermined integrating period and integrating time, and an integrated value of the indoor air mixing ratio offset added to the previous value in an adder 104 is calculated. Furthermore, a limit setting section 106 attaches limits of an upper limit of controlling and a lower limit of controlling, and then an indoor air mixing ratio offset RECratiohtr is determined.

The indoor air mixing ratio offset RECratiohtr is further corrected in an indoor/outdoor air temperature correcting section 107. The indoor/outdoor air temperature correcting section 107 defines the indoor air mixing ratio offset RECratiohtr as a correction in a direction (+) to increase the indoor air mixing ratio when the interior temperature is the outdoor air temperature or more, or conversely as a correction in a direction (−) to decrease the indoor air mixing ratio when the outdoor air temperature is higher than the interior temperature, the offset is then added to an indoor air mixing ratio basic value RECratio0 in an adder 99, and the indoor air mixing ratio RECratio is determined.

Therefore, when the interior temperature is higher than the outdoor air temperature, the indoor air mixing ratio RECratio is increased as much as the indoor air mixing ratio offset RECratiohtr as compared with the normal mode, whereby the amount of the heat to be absorbed in the heat absorber 9 enlarges, the high pressure rises to raise the radiator pressure PCI, and the temperature TH of the radiator 4 rises. In consequence, it is possible to further rapidly eliminate the temperature shortage of the radiator 4.

It is to be noted that the constitution of the refrigerant circuit R and the respective numeric values described in the above embodiment are not limited, and are, needless to say, changeable without departing from the gist of the present invention.

DESCRIPTION OF REFERENCE NUMERALS 1 vehicle air conditioner
2 compressor
3 air flow passage
4 radiator
6 outdoor expansion valve
7 outdoor heat exchanger
8 indoor expansion valve
9 heat absorber
11 evaporation capability control valve
17, 21, 22 and 23 solenoid valve
26 suction changing damper
27 indoor blower (a blower fan)
28 air mix damper
32 controller (control means)
57 electric heater
R refrigerant circuit

The invention claimed is:

1. A vehicle air conditioner comprising:
a compressor which compresses a refrigerant;
an air flow passage through which air to be supplied into a vehicle interior flows;
a radiator disposed in the air flow passage to let the refrigerant radiate heat;
a heat absorber disposed in the air flow passage to let the refrigerant absorb heat;
an outdoor heat exchanger disposed outside the vehicle interior to let the refrigerant radiate or absorb heat;
an expansion valve which decompresses the refrigerant flowing into the outdoor heat exchanger; and
control means being configured to change and execute at least one of:
a heating mode in which the refrigerant discharged from the compressor radiates heat in the radiator, and the refrigerant by which heat has been radiated is decompressed and then absorbs heat in the outdoor heat exchanger;
a dehumidifying and cooling mode in which the refrigerant discharged from the compressor radiates heat in the radiator and the outdoor heat exchanger and the refrigerant by which heat has been radiated is decompressed and then absorbs heat in the heat absorber; and
a cooling mode in which the refrigerant discharged from the compressor radiates heat in the outdoor heat exchanger and the refrigerant by which heat has been radiated is decompressed and then absorbs heat in the heat absorber,
wherein in at least the dehumidifying and cooling mode, the control means controls a capability of the compressor on the basis of a temperature of the heat absorber, and controls a valve position of the expansion valve on the basis of a temperature or a pressure of the radiator, and
executes a radiator temperature prior mode to enlarge the capability of the compressor, in a case where heat radiation in the radiator runs short.

2. The vehicle air conditioner according to claim 1,
wherein the control means has an internal cycle mode in which the refrigerant discharged from the compressor radiates heat in the radiator and the refrigerant by which heat has been radiated is decompressed and then absorbs heat in the heat absorber, and
also has, in this internal cycle mode, a state where the capability of the compressor is controlled on the basis of the temperature of the heat absorber and the valve position of the expansion valve is controlled on the basis of the temperature or the pressure of the radiator, and also executes the radiator temperature prior mode in the state.

3. The vehicle air conditioner according to claim 2,
wherein the control means lowers a target temperature of the heat absorber in a range where frost is not formed in the heat absorber, thereby enlarging the capability of the compressor.

4. The vehicle air conditioner according claim 3,
which comprises an electric heater to heat the vehicle interior,
wherein the control means allows the electric heater to heat in the radiator temperature prior mode.

5. The vehicle air conditioner according to claim 4,
which comprises an indoor blower which allows the air to flow through the air flow passage,
wherein the control means enlarges an air volume of the indoor blower in the radiator temperature prior mode.

6. The vehicle air conditioner according to claim 5,
which comprises a suction changing damper which changes an outdoor air introducing mode to introduce outdoor air into the air flow passage and an indoor air circulating mode to introduce the air in the vehicle interior into the air flow passage,
wherein in the radiator temperature prior mode, the control means transfers to the indoor air circulating mode in a case where at least an interior temperature is higher than an outdoor air temperature, and transfers to the outdoor air introducing mode in a case where at least the outdoor air temperature is higher than the interior temperature.

7. The vehicle air conditioner according claim 2,
which comprises an electric heater to heat the vehicle interior,
wherein the control means allows the electric heater to heat in the radiator temperature prior mode.

8. The vehicle air conditioner according to claim 2,
which comprises an indoor blower which allows the air to flow through the air flow passage,
wherein the control means enlarges an air volume of the indoor blower in the radiator temperature prior mode.

9. The vehicle air conditioner according to claim 2,
which comprises a suction changing damper which changes an outdoor air introducing mode to introduce outdoor air into the air flow passage and an indoor air circulating mode to introduce the air in the vehicle interior into the air flow passage,
wherein in the radiator temperature prior mode, the control means transfers to the indoor air circulating mode in a case where at least an interior temperature is higher than an outdoor air temperature, and transfers to the outdoor air introducing mode in a case where at least the outdoor air temperature is higher than the interior temperature.

10. The vehicle air conditioner according to claim 1,
wherein the control means lowers a target temperature of the heat absorber in a range where frost is not formed in the heat absorber, thereby enlarging the capability of the compressor.

11. The vehicle air conditioner according claim 10,
which comprises an electric heater to heat the vehicle interior,
wherein the control means allows the electric heater to heat in the radiator temperature prior mode.

12. The vehicle air conditioner according to claim 11,
which comprises an indoor blower which allows the air to flow through the air flow passage,
wherein the control means enlarges an air volume of the indoor blower in the radiator temperature prior mode.

13. The vehicle air conditioner according to claim 10,
which comprises an indoor blower which allows the air to flow through the air flow passage,
wherein the control means enlarges an air volume of the indoor blower in the radiator temperature prior mode.

14. The vehicle air conditioner according to claim 10,
which comprises a suction changing damper which changes an outdoor air introducing mode to introduce outdoor air into the air flow passage and an indoor air circulating mode to introduce the air in the vehicle interior into the air flow passage,
wherein in the radiator temperature prior mode, the control means transfers to the indoor air circulating mode in a case where at least an interior temperature is higher than an outdoor air temperature, and transfers to the outdoor air introducing mode in a case where at least the outdoor air temperature is higher than the interior temperature.

15. The vehicle air conditioner according to claim 1,
which comprises an electric heater to heat the vehicle interior,
wherein the control means allows the electric heater to heat in the radiator temperature prior mode.

16. The vehicle air conditioner according to claim 15,
which comprises an indoor blower which allows the air to flow through the air flow passage,
wherein the control means enlarges an air volume of the indoor blower in the radiator temperature prior mode.

17. The vehicle air conditioner according to claim 15,
which comprises a suction changing damper which changes an outdoor air introducing mode to introduce outdoor air into the air flow passage and an indoor air circulating mode to introduce the air in the vehicle interior into the air flow passage,
wherein in the radiator temperature prior mode, the control means transfers to the indoor air circulating mode in a case where at least an interior temperature is higher than an outdoor air temperature, and transfers to the outdoor air introducing mode in a case where at least the outdoor air temperature is higher than the interior temperature.

18. The vehicle air conditioner according to claim 1,
which comprises an indoor blower which allows the air to flow through the air flow passage,
wherein the control means enlarges an air volume of the indoor blower in the radiator temperature prior mode.

19. The vehicle air conditioner according to claim 18,
which comprises a suction changing damper which changes an outdoor air introducing mode to introduce outdoor air into the air flow passage and an indoor air circulating mode to introduce the air in the vehicle interior into the air flow passage,
wherein in the radiator temperature prior mode, the control means transfers to the indoor air circulating mode in a case where at least an interior temperature is higher than an outdoor air temperature, and transfers to the outdoor air introducing mode in a case where at least the outdoor air temperature is higher than the interior temperature.

20. The vehicle air conditioner according to claim 1,
which comprises a suction changing damper which changes an outdoor air introducing mode to introduce outdoor air into the air flow passage and an indoor air circulating mode to introduce the air in the vehicle interior into the air flow passage,
wherein in the radiator temperature prior mode, the control means transfers to the indoor air circulating mode in a case where at least an interior temperature is higher than an outdoor air temperature, and transfers to the outdoor air introducing mode in a case where at least the outdoor air temperature is higher than the interior temperature.

* * * * *